United States Patent [19]

Burns et al.

[11] 4,387,001

[45] Jun. 7, 1983

[54] METHODS AND APPARATUS FOR FABRICATING ELECTRICAL PHASE INSULATORS FOR DYNAMOELECTRIC MACHINES

[75] Inventors: Richard D. Burns; Albert J. Wesseldyk, both of Holland, Mich.

[73] Assignee: General Electric Company, Fort Wayne, Ind.

[21] Appl. No.: 271,327

[22] Filed: Jun. 8, 1981

Related U.S. Application Data

[63] Continuation of Ser. No. 51,029, Jun. 22, 1979, abandoned.

[51] Int. Cl.³ .......................................... B32B 31/16
[52] U.S. Cl. ..................................... 156/495; 29/598; 156/517; 156/522; 156/552; 156/560; 156/580.1
[58] Field of Search ................ 156/494, 495, 516, 517, 156/522, 552, 560, 580.1; 29/598; 264/290.7, 290.5

[56] References Cited

U.S. PATENT DOCUMENTS

| | | | |
|---|---|---|---|
| 2,597,884 | 5/1952 | Marks | 156/519 |
| 2,600,322 | 6/1952 | Raney | 156/519 |
| 3,278,363 | 10/1966 | Couquet | 156/517 |
| 3,575,623 | 4/1971 | Stine | 310/215 |
| 3,735,169 | 5/1973 | Balke et al. | 310/214 |
| 3,790,059 | 2/1974 | Jacke et al. | 156/580.1 |
| 4,100,005 | 7/1978 | McNeal | 156/73.1 |
| 4,266,994 | 5/1981 | Burns | 156/229 |
| 4,284,454 | 8/1981 | Joa | 156/560 |

FOREIGN PATENT DOCUMENTS

| | | |
|---|---|---|
| 359477 | 2/1962 | Switzerland . |
| 882323 | 11/1961 | United Kingdom . |
| 1194085 | 6/1970 | United Kingdom . |
| 1461126 | 6/1977 | United Kingdom . |

OTHER PUBLICATIONS

Labitzke, "Statomat . . . Material" Statomat News Bull. (1/74) p. 5.

Mononeff *Man Made Fibers* Heywood Books, London Chap. 23, pp. 406–407.

*Primary Examiner*—Jerome W. Massie
*Attorney, Agent, or Firm*—Ralph E. Krisher, Jr.

[57] ABSTRACT

Methods and apparatus for making electrical phase insulators for dynamoelectric machines are disclosed wherein a phase insulator includes two spaced apart planar portions formed of an insulating material interconnected by at least one connector made of an insulating material. First and second strips of planar insulating material are supplied and positioned at spaced apart locations at a securing station. At least one strip of connector material is supplied to a conditioning station and stretched for elongating and assuring straightness of the at least one connector strip. The stretching of the connector material is accomplished by gripping a second section of the connector strip at a location longitudinally spaced apart from a gripped first section and relatively moving the first and second sections thereby elongating a confined portion of the connector material located between the first and second sections. Elongation of the connector material strip removes curvature or "set" existing in the connector material and assures that the phase insulators being fabricated are provided with straight connectors. Straight connectors facilitate automatic or machine insertion of the phase insulators into dynamoelectric machine cores. A stretched portion of the at least one connector strip is advanced to the securing station and severed thereby establishing at least one elongated segment of connector material. The at least one elongated segment is positioned relative to the two strips of spaced apart planar insulating material at the securing station so that respective ends of the elongated segment overlap the first and second strips of planar material. The ends of the elongated segment are then fused or ultrasonically welded to the respective strips of planar insulating material thereby interconnecting the planar strips with the elongated segment or connector portion for establishing a phase insulator having a straight connector portion so as to facilitate machine insertion into a dynamoelectric machine magnetic core.

16 Claims, 17 Drawing Figures

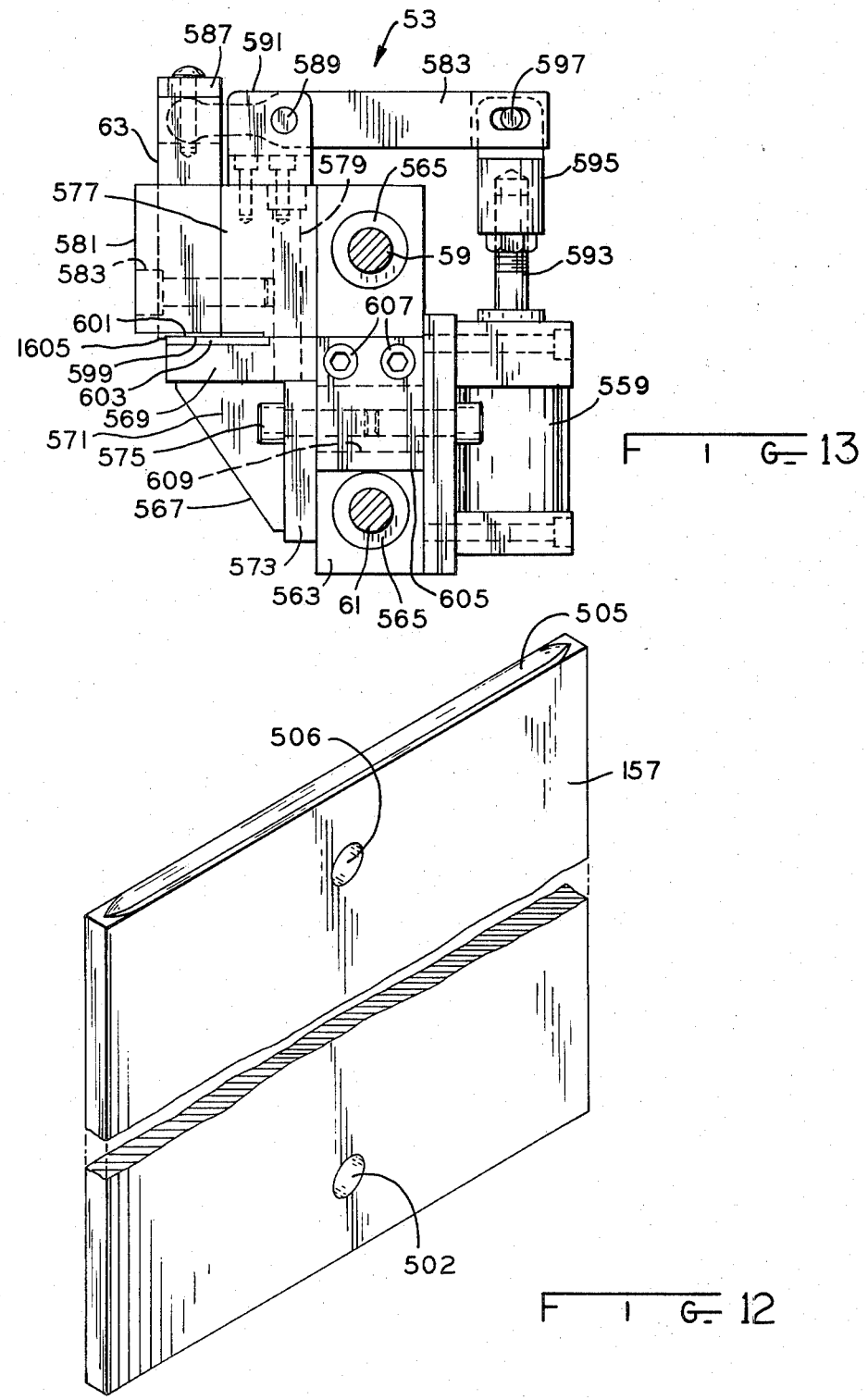

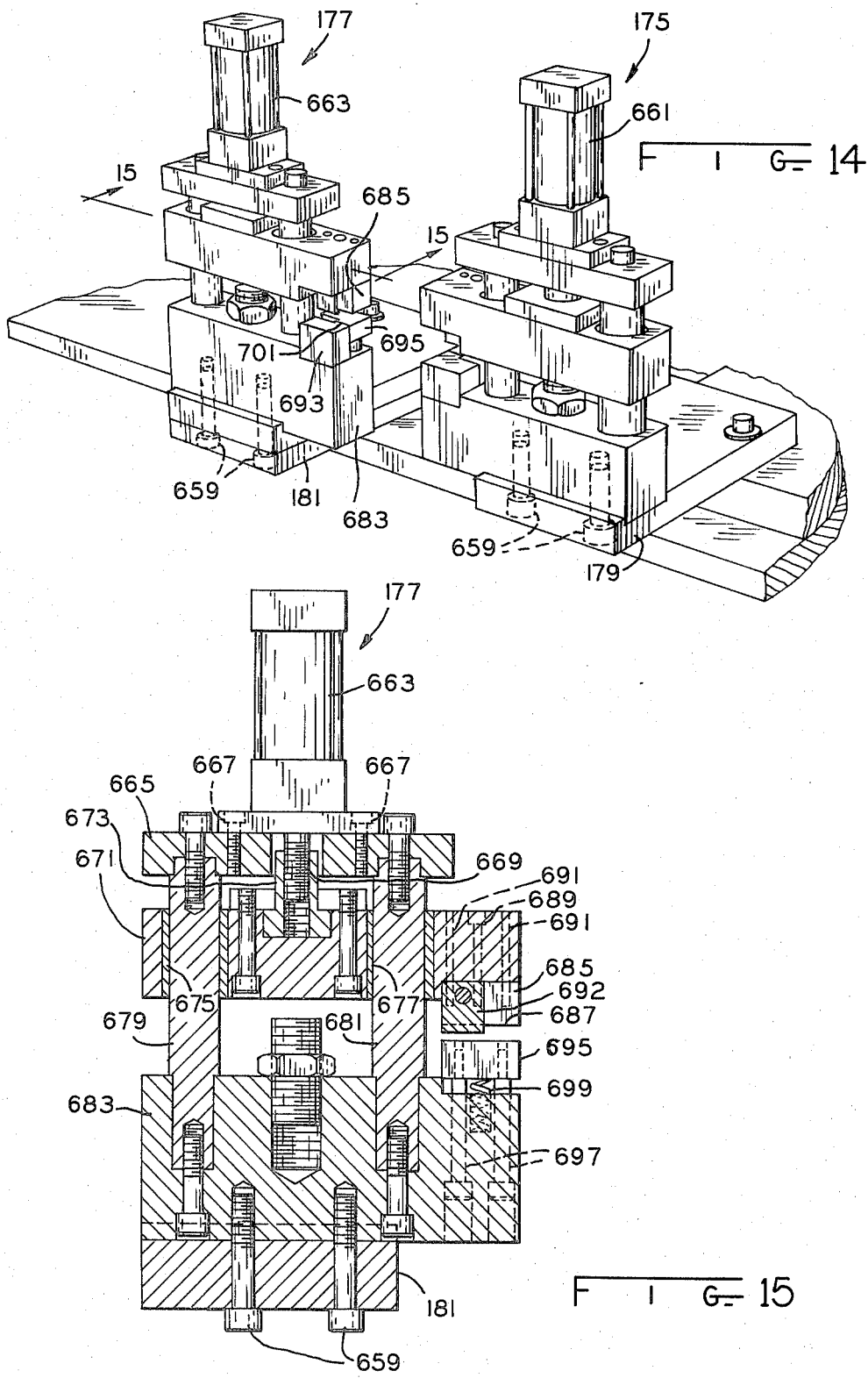

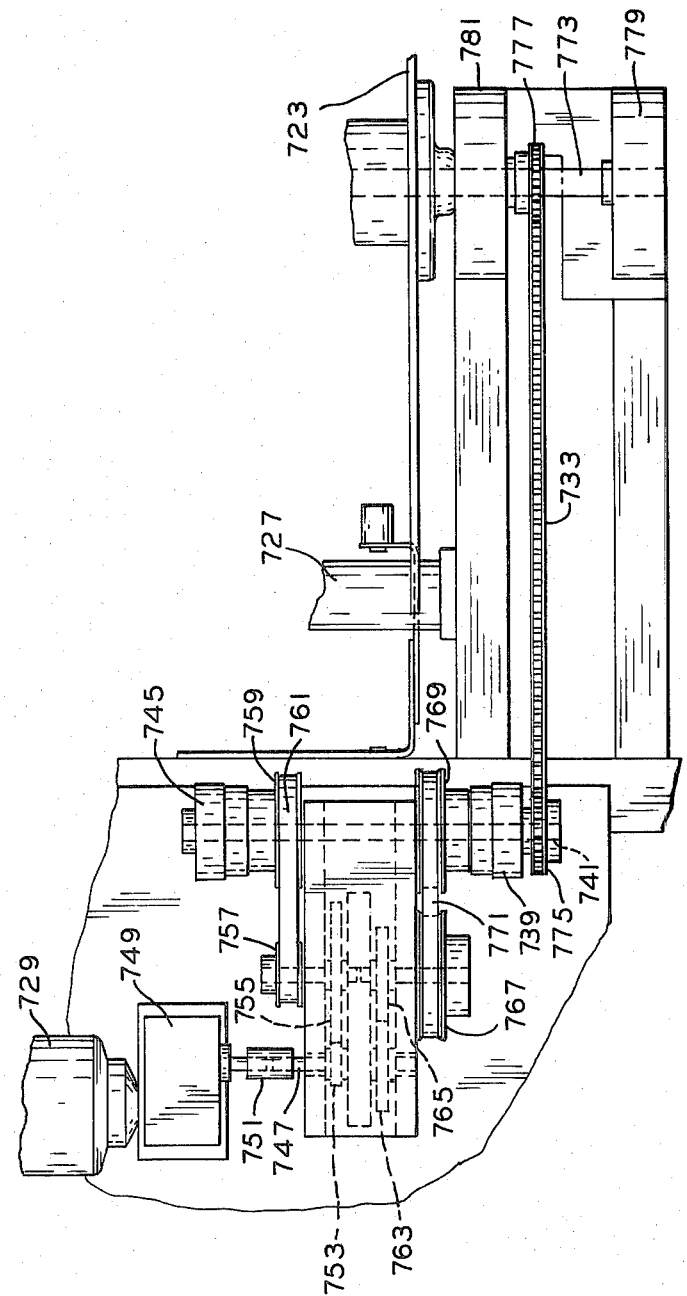

METHODS AND APPARATUS FOR FABRICATING ELECTRICAL PHASE INSULATORS FOR DYNAMOELECTRIC MACHINES

CROSS REFERENCE TO RELATED APPLICATION

This a continuation, of application Ser. No. 051,029, filed June 22, 1979, now abandoned.

This application is related to co-pending application Ser. No. 8,603 filed Feb. 1, 1979 now U.S. Pat. No. 4,266,994 in the name of Richard D. Burns and entitled "Dynamoelectric Machine Phase Insulators and Apparatus and Methods For Making the Same". The entire disclosure of this related application is hereby specifically incorporated herein by reference.

BACKGROUND OF THE INVENTION

The present invention relates to apparatus and methods for manufacturing electrical phase insulators for dynamoelectric machines.

As is well known in the art, dynamoelectric machine stator assemblies may often comprise a magnetic core having a bore, axially extending slots, and windings which may comprise a plurality of coils formed by multiple turns of wire conductor. The multiple turns have side turn portions which are disposed within the axially extending slots, and end turn portions which project from the slots and which are disposed about end faces of the core. The conductors employed in forming the plurality of coils are provided with an electrically insulating coating to prevent short circuiting between the turns and each slot is electrically insulated from the core by, for example, a slot liner in order to prevent grounding of the windings to the stator core. Because winding to winding voltage potentials can be appreciable, the conductor turns of one winding are often separated or insulated from the conductor turns of another winding by additional insulation. This additional insulation may include insulating wedges or slot separators disposed within the slots of the magnetic core to separate side turn portions of one winding from the side turn portions of another winding. The end turn portions of different windings are often separated from one another by phase insulators disposed about faces of the core and between end turn portions of the different windings.

Insulators for separating end turn portions of different windings or winding phases of dynamoelectric machines such as motors are generally well known in the prior art. For example, Stein U.S. Pat. No. 3,575,623 of Apr. 20, 1971; McNeal U.S. Pat. No. 4,100,005 of July 11, 1978; and Droll United Kingdom U.S. Pat. No. 1,461,126 of Jan. 13, 1977 all illustrate and describe what is referred to herein as phase insulation. Moreover, co-pending application Ser. No. 918,055 which was filed June 22, 1978 in the name of Sammy L. Miller and Alan L. Kindig (entitled: "Methods and Apparatus For Inserting Winding End Turn Phase Insulation") relates to, among other things, utilization of phase insulation. The disclosures of all of these above-mentioned patents and application are incorporated herein by reference.

As discussed in the McNeal and Droll patents, methods utilized in the past in the fabrication of phase insulation have been wasteful of material. One such common method has involved the stamping of phase insulation pieces from a sheet or strip of insulating material. This process has resulted in production of large volumes of scrap, with the amount of scrap being generally proportional to the length of the "connectors" which interconnect generally planar insulation pieces that ultimately are circumferentially disposed in a stator assembly between radially spaced, circumferentially extending end turn portions of two different phase windings. Another problem associated with the more common practice of stamping phase insulation pieces is that different dies must be provided in order to produce insulators that are used with motors having different stack heights. Motor manufacturers typically produce motors having a wide range of stack heights or core lengths, and thus, different phase insulators with varying length connectors must be provided for the motors having different core lengths. The co-pending related Burns application Ser. No. 8,603 discloses, among other things, new approaches to fabricating such stamped phase insulators which substantially reduce the material waste and die inventory problems discussed above. The above-referenced Droll patent and McNeal patent represent another approach for fabricating phase insulators which reduces problems such as material waste and die inventories. With the approach represented by the McNeal and Droll patents, phase insulators are fabricated from different strips or bands of material as opposed to stamping a phase insulator from a single sheet of material. Thus, material waste and die inventories are substantially reduced with this approach. The above-referenced related Burns application also discloses, among other things, a way of still further reducing the amount of material utilized in producing individual phase insulators.

The above-referenced Miller et al application teaches one approach for automatically placing phase insulation in stator cores; and the above-referenced Droll patent teaches a very different approach for machine placing phase insulation in slots of stator cores. As discussed in the related Burns application, it has been determined that some problems may be encountered due to the inherent nature of insulator pieces that have been available heretofore. More specifically, when insulation pieces manufactured as illustrated in the Droll patent are placed in automatic coil placing equipment, problems arise due to the fact that the connectors of phase insulation fabricated as described by Droll do not become properly positioned in stator slots. In the case of the approach described by Miller et al, difficulties may be encountered in positioning the connectors of phase insulation in slots of insulator placing tooling disclosed by Miller et al. More specifically, when insulators are produced from planar insulation material and filamentary material which typically is supplied in coiled or rolled form, such material tends to have a curvature or "set". This curvature appears to remain and still be present in material even after phase insulators have been formed. However, curvature of the connectors in phase insulation pieces is particularly troublesome when machines are used to automatically place such connectors in long straight slots - whether such slots be the slots of a stator core of slots of an insulator placing apparatus.

The related co-pending Burns application discloses, among other things, new and improved phase insulators characterized by straight filamentary connectors. These phase insulators, with connectors having any curvature or "set" removed therefrom, eliminate problems previously encountered in automatic placement of phase insulators in magnetic cores as previously discussed.

Further, the new insulators require less material for fabrication than that previously required by prior known insulators.

Thus, it would be desirable to provide new and improved apparatus and methods for fabricating phase insulator, e.g., insulators disclosed by the co-pending Burns application, or by others.

Accordingly, it is a general object of the present invention to provide new and improved apparatus and methods for fabricating phase insulators.

A more specific object is to provide new and improved apparatus and methods for fabricating insulators having straight connectors of the type disclosed in the previously mentioned Burns application.

More specifically, an object of the present invention is to provide new and improved methods and apparatus for fabricating phase insulators having a connector portion of filamentary material and wherein such insulators may be easily inserted by machine into straight slots of a magnetic core.

Another object of the present invention is to provide new and improved methods and apparatus for fabricating phase insulators which minimize fabrication steps and material handling.

Still another object of the present invention is to provide new and improved methods of fabricating phase insulators from strips of materials of indeterminate length.

A further object of the present invention is to provide new and improved apparatus for moving, manipulating, securing and severing material strips of indeterminate length for establishing phase insulators having a configuration which facilitates subsequent machine placement in a magnetic core.

A still further object of the present invention is to provide new and improved apparatus having means for conditioning at least one strip of material utilized as connectors for phase insulators so as to remove any curvature or "set" therein prior to securing such connectors to planar strips of insulating material for establishing phase insulators.

SUMMARY OF THE INVENTION

In carrying out the above and other objects in one form, we provide a method of making electrical phase insulators for dynamoelectric machines wherein a phase insulator includes two spaced apart planar portions formed of an insulating material interconnected by at least one connector made of an insulating material. In one preferred method, we supply first and second strips of planar insulating material and position the strips at spaced apart locations at a securing station. We also supply at least one strip of connector material to a conditioning station. In one preferred approach, we stretch a portion of the at least one strip of connector material, thus elongating and assuring straightness of such portion. The stretching of the connector material may be accomplished by gripping a second section of the connector strip at a location longitudinally spaced apart from a first section and relatively moving the first and second sections thereby elongating a predetermined portion of the connector material located between and defined by the first and second sections. Elongation of the connector material strip removes prior curvature or "set" existing in the connector material and assures that the phase insulators being fabricated are provided with straight connectors. Straight connectors facilitate automatic or machine insertion of the phase insulators into dynamoelectric machine cores.

One preferred method further includes advancing a stretched portion of the at least one strip of connector material to the securing station and severing the stretched portion thereby establishing at least one elongated segment of connector material. The at least one elongated segment is positioned relative to the two strips of spaced apart planar insulating material at the securing station so that respective ends of the elongated segment overlap the first and second strips of planar material. The ends of the elongated segment are then fused to the respective strips of planar insulating material thereby interconnecting the planar strips with the elongated segment or connector portion for establishing a phase insulator having a straight connector portion so as to facilitate machine insertion into a dynamoelectric machine magnetic core. The at least one strip of connector material, in a preferred form, is formed from a filamentary material comprising a polyester monofilament insulating material and the strips of planar insulating material are formed from polyethylene terephalate. The ends of the at least one elongated segment of connector material may be secured to the strips of planar insulating material by ultrasonically welding the ends of the at least one segment to the respective planar strips.

In accordance with another form of the present invention which may also be used to carry out the above-described method, we provide an apparatus for fabricating electrical phase insulators wherein a phase insulator includes two spaced apart planar portions formed of an insulating material interconnected by at least one connector made of an insulating material. We provide a means for feeding first and second strips of planar insulating material to a securing station and a means for positioning the first and second strips at spaced apart locations at the securing station. The means for feeding the first and second strips of planar material may include a clamp feed unit operative to substantially simultaneously engage the first and second strips of planar material and to pull each of the respective planar strips in a step-like manner so as to position different sections of the planar strips at the securing station. A means is provided for guiding movement of the planar strips along substantially parallel paths and for positioning the first and second planar strips at spaced apart locations at the securing station. A conditioning station including a stretching means is provided for elongating a portion of at least one strip of connector insulating material. This elongation of the connector material removes prior curvature or "set" existing in the connector material to assure that the phase insulators being fabricated are provided with straight connectors to facilitate subsequent automatic or machine placement into dynamoelectric machine cores.

In one form, the stretching means includes two spaced apart clamping devices for gripping at least one strip of connector material at spaced apart locations. The stretching means also includes a means for moving at least one of the clamping devices while the at least one strip of connector material is simultaneously gripped by both clamping devices for causing elongation of a portion of the connector strip located between the two clamping devices. A means is also provided for advancing connector insulating material from the stretching station to the securing station after the connector material has been elongated at the stretching station station. In one form, the means for advancing may include one of the clamping devices which is also utilized as part of the stretching means for elongating the connector material. The apparatus further includes a means for severing at least one elongated segment of the connector material and a means for positioning the at least one elongated segment relative to the planar strips at the securing station so that respective ends of the segment overlap the first and second strips of planar material. The securing means may include, for example, an ultrasonic welding device. The securing means, which is located at the securing station, secures one end of the at least one elongated segment to the first strip of planar insulating material and secures the other end of the elongated segment to the second strip of insulating material thereby interconnecting the two planar strips for establishing a phase insulator.

In accordance with another aspect of the present invention, a stretching means is provided including a means for varying the amount of elongation of at least one strip of connector material. In one form, the stretching means includes two spaced apart clamping devices for gripping two connector material strips at spaced apart locations and means for moving one of the clamping devices while the connector strips are simultaneously gripped by both clamping devices. A restraining force determined in accordance with the amount of elongation desired, is applied to the other clamping device. Movement of the one clamping device causes the restraining force applied to the other clamping device to be overcome and thus cause movement of the other clamping device. Movement of the strips of connector material during the stretching operation by the clamping devices advances portions of the connector strip previously elongated or stretched to the securing station for subsequent severing and interconnection with the two planar strips.

In accordance with still another aspect of the present invention, an adjustment means is provided for varying the separation distance between the two spaced apart planar strips at the securing station in accordance with the stack height of dynamoelectric machine magnetic cores into which the phase insulators are to be placed. An advance adjustment means for varying the length of connector material moved to the securing station is also provided for allowing phase insulators to be fabricated for dynamoelectric machines having magnetic cores of different stack heights.

In accordance with still another aspect of the present invention, a configuring means is provided for cutting portions of the planar strips so as to substantially simultaneously establish a desired configuration for a trailing end of one phase insulator and a desired configuration for a leading end of another phase insulator. The apparatus may also be provided with means for receiving interconnected phase insulators after they have been moved from the securing station so as to accumulate the insulators in, for example, a roll for subsequent use. As an alternative, the apparatus may include a cutting mechanism for severing the two planar strips after they have been moved from the securing station for establishing discreet phase insulators.

The subject matter which we regard as our invention is set forth in the appended claims. The invention itself, however, along with further objects and advantages thereof will be better understood by referring to the following description taken in connection with the accompanying drawings.

BRIEF DESCRIPTION OF THE DRAWINGS

FIG. 12 is a detail of a connector severing and positioning blade illustrated in FIGS. 9 and 11;

FIG. 13 is a front view of one of the two clamping units of the planar strip feed unit illustrated in FIG. 1, this FIG. 13 being a view taken generally along the lines 13—13 of FIG. 4;

FIG. 14 is a perspective view of two cut-off units which may be mounted on the apparatus of FIG. 1 for separating the phase insulators;

FIG. 15 is a cross-sectional view of one of the cut-off units of FIG. 14 taken along the lines 15—15 in FIG. 14;

FIG. 17 is a partial plan view of the take-up unit of FIG. 17.

DESCRIPTION OF THE PREFERRED EMBODIMENTS

Figure 1:
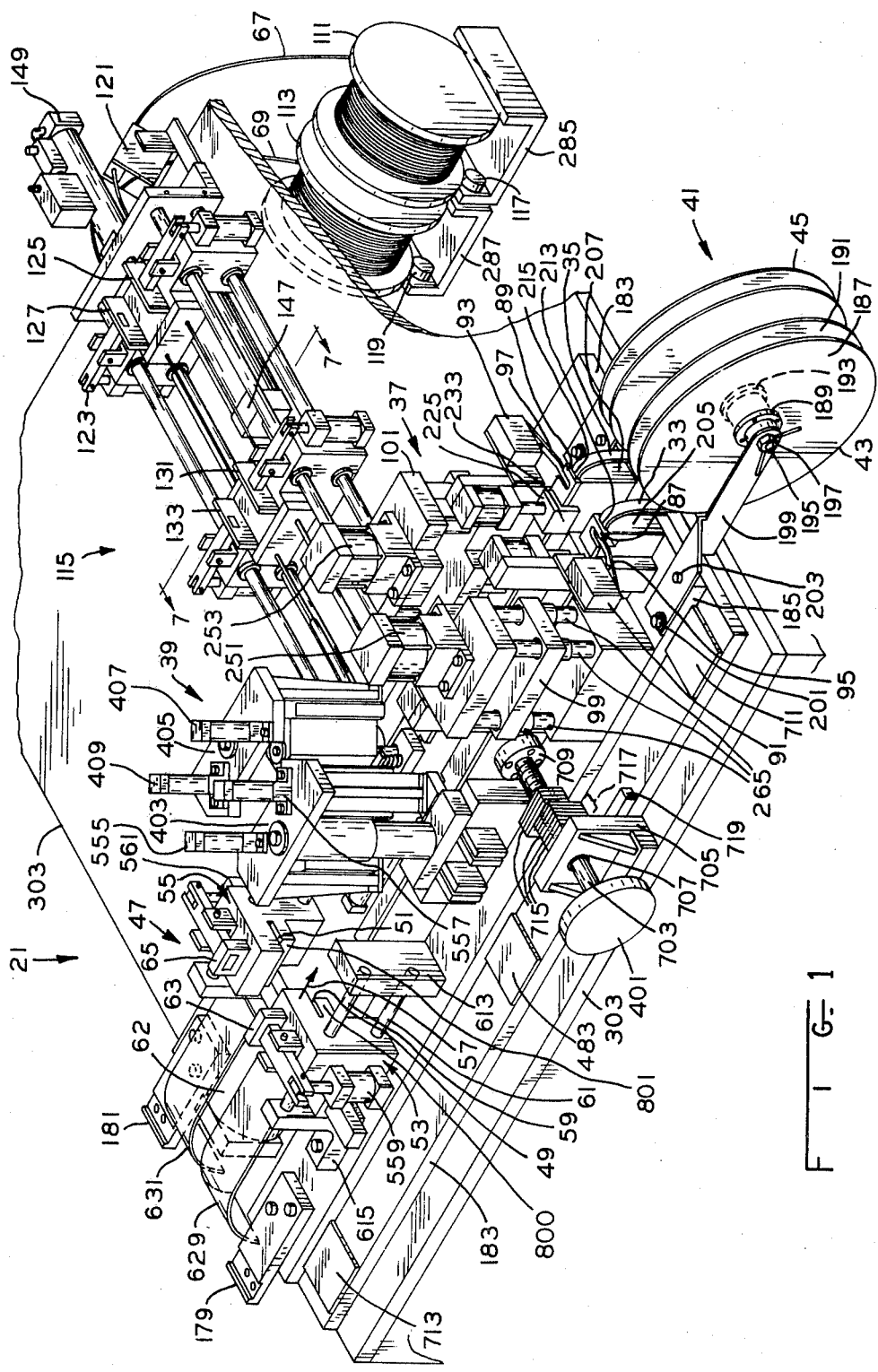
FIG. 1 is a perspective view of an apparatus embodying the present invention in one form and which may be used to practice the invention in one form thereof.
Figure 2:
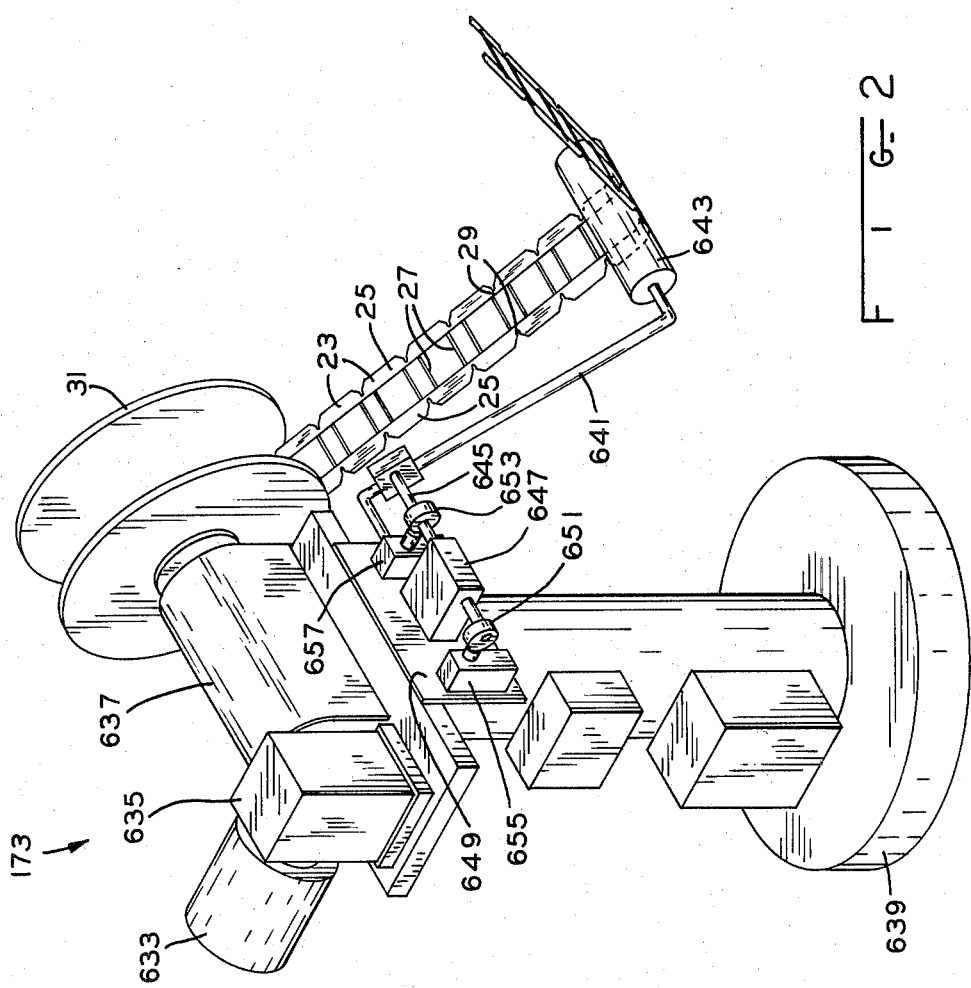
FIG. 2 is a perspective view of a phase insulator take-up arrangement which may be utilized with the apparatus of FIG. 1.
Figure 3:
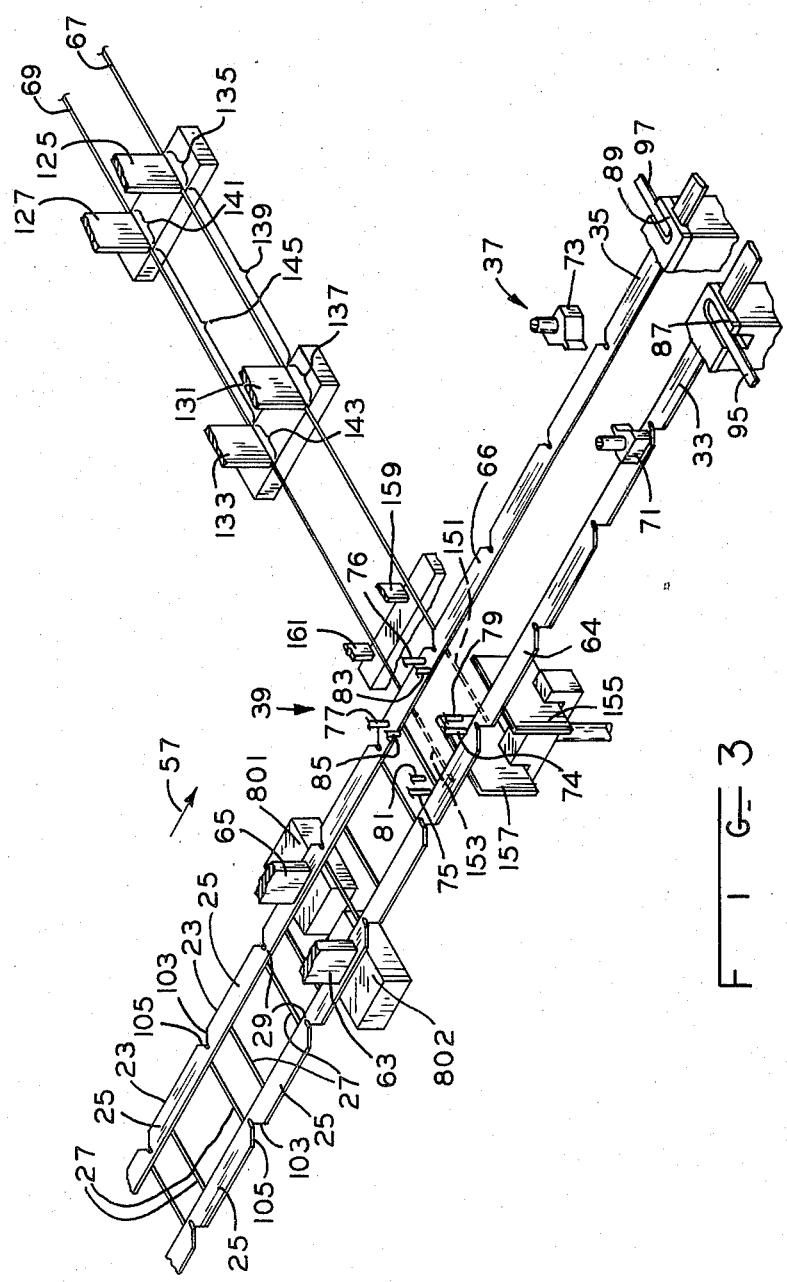
FIG. 3 is a perspective view of portions of the apparatus of FIG. 1 with parts broken away for illustration purposes.

One way of practicing the present invention, in one form, will be described with reference to FIGS. 1-3. FIG. 1 perspectively illustrates an apparatus 21 which may be employed in carrying out the present invention, in one form thereof, for fabricating electrical phase insulators for dynamoelectric machines such as, for example, phase insulators 23 illustrated in FIGS. 2 and 3. FIG. 3 schematically illustrated portions of the apparatus not clearly visible in FIG. 1. As shown in FIGS. 2 and 3, each of the phase insulators 23 comprise oppositely disposed planar portions 25 interconnected by connectors or connector portions 27 which are secured to the planar portions as will be discussed more fully hereinbelow. Referring to FIG. 2, the phase insulators are shown interconnected with each other by planar segments 29 which interconnect adjacent planar portions of the phase insulators. The planar segments allow the insulators to be accumulated or stored on an accumulating means illustrated as take-up roll 31. The segments are subsequently severed to establish discrete phase insulators for placement into a dynamoelectric machine. However, as will be discussed more fully hereinbelow, the planar interconnection segments may be severed prior to removal from the apparatus of FIG. 1. The planar portions 25 are formed from an insulating material such as, for example, polyethylene terephalate which may be purchased under the trade name "Mylar" marketed by E. I. DuPont de Nemours and Company. The connectors are also formed of an insulating material such as, for example, a filamentary or polyester monofilament material. For example, insulating material which has been utilized for the connectors has been a polyester monofilament material marketed as "Traver" Grade T-960 by Hoechst Fibers Ind., a Division of American Hoechst Corporation having offices at 515 Broadway at Astro Plaza, New York, N.Y. 10036. The size of one particular material that has been used was 1.05 millimeters in diameter (0.042 inches). The connectors 27 which interconnect the planar portions 25 are conditioned during the fabrication process so as to remove curvature or "set" in the connector material as will be discussed more fully hereinbelow. The conditioning of the connectors provides the phase insulators with straight connectors which facilitates automatic or machine placement of the insulators into dynamoelectric machine cores.

Referring to FIG. 1, the phase insulators are fabricated by supplying two long or indeterminate length planar strips 33 and 35 of insulating material to a configuring station 37 and a securing station 39 from a let off station 41 comprising two spools 43 and 45 accommodating the respective strips of planar insulating material. The two planar strips are intermittently moved or pulled in a step-like manner by a feed unit 47 so as to position different portions of the strips at the configuring and securing stations. Although strips 33 and 35 are not illustrated in FIG. 1, the planar strips 33 and 35 extend through recesses 49 and 51, respectively of clamping units 53 and 55 of the feed unit. Movement of the planar strips is accomplished by moving the clamping units 53 and 55 parallel to the strips in a longitudinal direction 57 toward the securing station along respective guide and support rails such as, for example, guiding and support rails 59 and 61 illustrated for the clamping unit 53. This movement of the clamping units is accomplished by extending feed cylinder 62 which is connected to the clamping units for causing movement thereof. The planar strips 33 and 35 are then substantially simultaneously gripped or clamped by moving clamping blocks or bars 63 and 65 of the clamping units 53 and 55, respectively, downwardly into engagement with their respective planar strip. The strip is then gripped between bars 63, 65 and lower jaw portions 800 and 801 of the units 53, 55 and movement of units 53, 55 (along the support rails) causes movement of the strip material while it is so gripped.

FIG. 3 depicts parts of the apparatus 21 of FIG. 1 after the clamping units 53 and 55 have been moved along their respective guide rails in the direction of arrow 57 toward the securing station and clamping bars 63 and 65 of the respective clamping units have subsequently moved into engagement with the planar strips 33 and 35, respectively. The gripped planar strips are then pulled through the configuring station 37 and the securing station 39 by moving the clamping units back along their respective guide rails in a direction opposite the direction 57 (FIG. 1). This pulling or feeding of the planar strips moves planar portions 64 and 66 of the planar strips 33 and 35, respectively, into position at the securing station for subsequent positioning and welding of connectors therebetween. Portions of connector material strips 67 and 69 are being advanced into the securing station simultaneously with the movement of the planar strips as will be discussed more fully hereinbelow. This intermittent feeding or pulling of the planar strips also removes additional planar strip material from each of the supply spools or rolls 43 and 45 (see FIG. 1). It should be noted from FIG. 3 that punches 71 and 73, ultrasonic welding tips 74–77 and connector retaining elements or fingers 79, 81, 83 and 85 are retracted prior to beginning movement of the planar strips in order to allow unobstructed movement of the planar strips.

Figure 4:
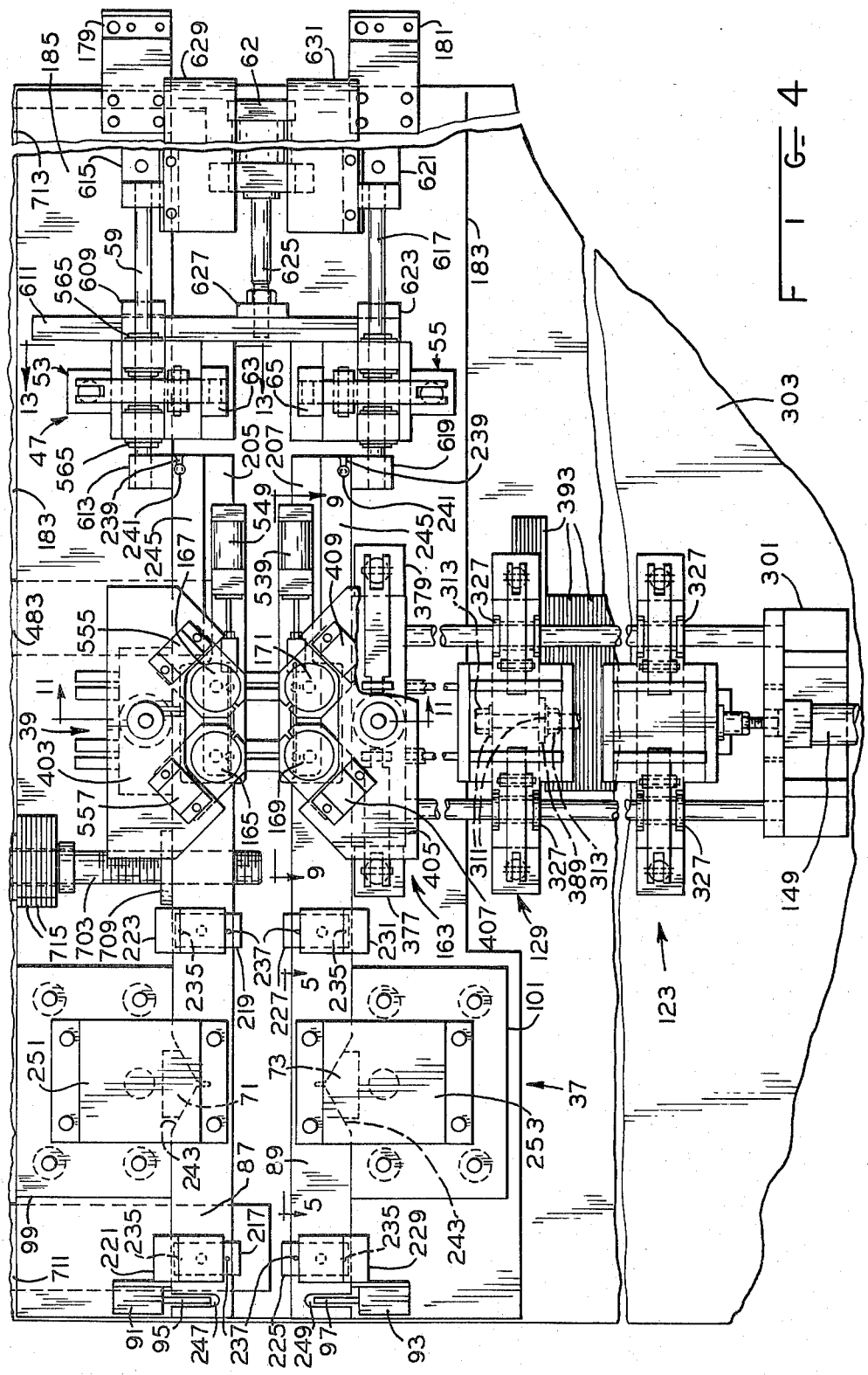
FIG. 4 is a re-oriented partial plan view of the apparatus of FIG. 1.

After leaving the supply or let-off station 41, the two planar strips 33 and 35 are guided to the configuring station 37 and the securing station 39 along spaced apart longitudinally extending paths by a guiding means illustrated as two guide plates 87 and 89 (see FIGS. 3 and 4). The guide plates which extend beyond the securing station, assure maintenance of a predetermined transverse separation distance between the two planar strips thereby assuring proper positioning of the strips at the configuring and securing stations. The guide plates are provided with appropriate cut-out sections (see FIG. 4) to permit access to the planar strips for performing the configuring and securing operations as discussed more fully hereinbelow.

As revealed in FIGS. 1 and 4, the supply of planar strips 33 and 35 is sensed by a supply monitoring means illustrated as two limit switches 91 and 93, respectively, having actuating arms 95 and 97, respectively which engage the respective planar strips thereby indicating the actual existence of the strips within the guide plates 87 and 89. An absence of a planar strip causes operation of the appropriate limit switch which in turn stops operation of the apparatus until a new supply of planar material has been loaded onto the appropriate supply spool.

At the configuring station 37 illustrated in FIG. 1, the two planar strips 33 and 35 are shaped or configured by shearing or cutting portions from the planar strips. As illustrated in FIG. 3, the desired configuration for the planar portions 25 of the different phase insulators 23 being fabricated is established by a configuring means illustrated as including the punches 71 and 73 of configuring units 99 and 101 (FIG. 1), respectively. The configuration for leading end portions 103 of a phase insulator and trailing end portions 105 of an adjacent phase insulator is established at substantially the same time by substantially simultaneously operating the two punches.

While portions of the planar strips 33 and 35 are being shaped or configured at the configuring station, previously configured portions of the planar strips are in position at the securing station 39 for securing connectors thereto.

As shown in FIG. 1, the connectors are prepared or conditioned for interconnection with the planar strips by supplying two long strips 67 and 69 of connector material along spaced apart paths from a connector supply means, illustrated as two spools 111 and 113 to a conditioning station 115. The two spools 111 and 113 are mounted upon rollers such as, for example, rollers 117 and 119 to facilitate removal of the connector strips from the spools. The two connector strips are supplied to the conditioning station by way of a guide and supply monitoring means illustrated as two guide and limit switch units such as the limit switch unit 121. Each of the limit switch units has an electrical contact therein which is actuated for stopping the operation of the apparatus upon sensing that a spool has run out of connector material.

At the conditioning station 115, the two connector strips 67 and 69 are conditioned to remove curvature or "set" from the strips which exists because of the circular type accumulation or storage of the strips on the spools 111 and 113. This conditioning of the connector strips assures fabrication of phase insulators having straight connectors so as to facilitate automatic or machine insertion of the phase insulators into dynamoelectric machine cores.

In the illustrated arrangement of FIG. 1, the conditioning or stretching station is provided with a first clamping unit 123 having clamping bars 125 and 127, and is also provided with a second clamping unit 129 having clamping bars 131 and 133. The connector strips 67 and 69 extend through the first and second clamping units into the securing station 39. Stretching or elongation of the connector strips is accomplished by gripping each connector strip at spaced apart locations along the longitudinal extent of the respective strip and then moving the gripped sections of the respective strip relative to each other thereby applying stress to the respective connector strip so as to stretch or elongate the portion of the connector strip located between the two gripped sections of the strip. In the illustrated arrangement of FIG. 1, the connector strip 67 is gripped at spaced apart locations along the longitudinal extent of the strip by the clamping bar 125 of the clamping unit 123 and the clamping bar 131 of the clamping unit 129. The connector strip 69 is gripped at spaced apart locations by clamping bar 127 of clamping unit 123 and the clamping bar 133 of the clamping unit 129.

As illustrated more clearly in FIG. 3, the clamping bars 125 and 131 grip segments or sections 135 and 137, respectively, of the connector strip 67 with a segment 139 being confined between the two clamping bars. The clamping bars 127 and 133 grip spaced apart sections or segments 141 and 143, respectively, of the connector strip 69 with segment or section 145 being confined between the two clamping blocks. After the connector strips have been gripped at spaced apart locations, gripped segments 137 and 143 are moved relative to the gripped segments 135 and 141 by moving the clamping unit 129 (FIG. 1) toward the securing station by activation or extension of an advancing cylinder 147 (FIG. 1) which is connected to the second clamping unit. The advancing cylinder is extended substantially simultaneously with retraction of the feed cylinder 62 (FIG. 1) which moves the planar strip clamping units 53 and 55 (FIG. 1) for pulling the planar portions 64 and 66 into position at the securing station as previously discussed. The gripped sections 135 and 141 of the respective connector strips are initially restrained from movement by application of a restraining force to the first clamping unit. Referring again to FIG. 1, the first clamping unit is initially restrained from movement by application of a predetermined retraction pressure to stretch cylinder 149 which is connected to the first clamping unit. In an actual reduction to practice, the first clamping unit has been restrained from movement by application of a regulated air pressure of 60 psi to a stretch cylinder which was a Tiny Tim cylinder series AVT-Style R having a one and one eighth inch (28.6 mm) bore a five-sixteenths of an inch (7.93 mm) rod, and a six inch (152.4 mm) stroke. The calculated force applied to the clamping unit (and thus the two filament segments 67, 69) was about fifty-five pounds, disregarding frictional resistance to movement of the clamping unit. Thus, about twenty-seven to twenty-eight pounds (12.5 kg.) of tensile force was applied to each of the 0.042 inch diameter filament segments being stretched. Movement of the second clamping unit toward the securing station causes pulling forces to be transmitted to the first clamping unit by way of the confined portions 139 and 145 (FIG. 3) of the connector strips 67 and 69, respectively. These pulling forces subject the confined portions to an elongating stress which stretches or elongates the confined portions without causing objectionable damage thereto. Continued movement of the second clamping unit overcomes the restraining force being applied to the first clamping unit, and thus, causes the first clamping unit to be pulled along the guide rails by the second clamping unit. The amount of elongation or stretch to which the confined portions are subjected may be varied by varying the retraction pressure being applied to the stretch cylinder, and more force would be applied to larger diameter material or if it were desired to elongate the material by a greater amount. With the connector strips being formed of filamentary or monofilament material as previously described, it is preferred to stretch the filamentary material or connector strips in the neighborhood of from about six to ten percent. This approach not only results in a reduction of the amount of filamentary material that must be used for a given connector, but also causes the connector strip material to take on a straight configuration so that the "set" or curvature of the filamentary material is removed. More details concerning this stretching action are spelled out in the incorporated by reference Burns application. It is also now noted that with the illustrated apparatus, it is a very simple matter to change the amount of air pressure supplied to cylinder 149; and it is necessary only to stretch the filamentary material an amount sufficient to ensure its straightness. This of course also ensures the accurate placement of the connectors relative to the planar insulating portions.

Movement of the two connector strips 67 and 69 during the stretching operation described hereinabove also causes advancement of previously elongated portions of the connector strips to the securing station 39. As the second clamping unit 129 moves toward the securing station, the second clamping unit causes previously elongated portions of the connector strips to be pushed or advanced into the securing station. Further, additional connector strip material is pulled from the supply spools 111 and 113 by movement of the first clamping unit 123 toward the securing station during the stretching operation. The distance of movement of the second clamping unit is varied, as will be discussed more fully hereinbelow in accordance with the stack height or axial length of dynamoelectric machine cores into which the phase insulators being fabricated are to be inserted so as to provide phase insulators for the different cores.

The stretching of the filamentary material causes it to "stiffen", and because of this stiffened condition, the filamentary material can be reliably and consistently moved by "pushing" it as described hereinabove without objectionable buckling of the material.

As can be seen more clearly in FIG. 3, previously elongated connector strip portions 151 and 153 (shown with dashed lines) of the strips 67 and 69, respectively have been moved during the stretching operation into a position above severing and positioning blades 155 and 157, respectively at the securing station 39. After the elongated portions have been advanced into the securing station, the connector strips 67 and 69 are clamped by clamping bars 159 and 161, respectively, of the third clamping unit 163 (FIG. 6) in order to prevent retraction of the respective connector strips during subsequent release of the strips by the first and second clamping units and retraction of these units back along their respective guide rails to a position for beginning another stretching operation. While the connector strips are being gripped by the clamping bars 159 and 161, the planar strips 33 and 35 are configured by the punches 71 and 73, respectively, as previously discussed, and the finger elements or retainers 79, 81, 83 and 85 are moved downwardly (as viewed in FIG. 3) in preparation for a subsequent securing operation discussed hereinbelow.

As mentioned previously, the previously stretched or elongated portions 151 and 153 of the connector strips 67 and 69, respectively, have been extended into the securing station (as shown by dashed lines) by movement of the second clamping unit 129, and the planar portions 64 and 66 have also been moved into the securing station substantially simultaneously with advancement of the elongated portions. The stretched portions extend transversely to the planar strips 33 and 35 and are located in a plane vertically displaced from the plane of the planar strips. The stretched portions are then severed by moving severing blades 155 and 157, respectively, upwardly (as viewed in FIG. 3) toward the spaced apart planar strips. The severed connector segments are then moved by the severing blades into position adjacent to the two planar strips so that each severed segment extends between the two planar strips with the ends of the elongated segments overlapping the planar strips. The elongated severed segments or connectors are held in position upon their respective severing blade for a subsequent securing operation the retaining fingers 79, 81, 83 and 85. Substantially simultaneously with the severing operation, the clamps 63 and 65 are moved out of engagement with their respective planar strip and the clamps 127, 133, 135 and 137 are moved out of engagement with their respective connector strip. Longitudinal movement of the planar strips is prevented by punches 71 and 73 which are in a down position during the severing operation. Retraction of the connector strips are prevented by the clamps or grippers 159 and 161.

After the connectors have been positioned adjacent to the planar strips with ends thereof overlapping the planar strips, the connectors are secured to the planar strips by activation of a securing means illustrated as four welding units 165, 167, 169 and 171 (FIG. 4) having the ultrasonic welding tips 74–77 respectively. The planar strips are engaged by the respective ultrasonic welding tips for a short time such as, for example, 1½ seconds, for transmitting ultrasonic vibrations thereto with such vibration fusing or welding the ends of the connectors to their respective planar strips for establishing a phase insulator. At approximately the same time as the welding operation is being performed, the feed clamping units 53 and 55 (FIG. 1) are moved toward the securing station and the second clamping unit 129 (FIG. 1) is moved away from the securing station in preparation for feeding additional planar and connector strip materials for another securing operation.

After the connectors have been secured to the planar strips, the welding tips 74–77 are moved upwardly out of engagement with their respective planar strip, and the retainers or finger elements 79, 81, 83 and 85 are held in their up position so as to prevent interference with subsequent movement of the welded together planar strips and connectors. The clamps 63 and 65 are once again moved into engagement with their respective planar strip in preparation for feeding or pulling the planar strips. The connector strips 67 and 69 are also again engaged by the clamps 127 and 133 and the clamps 135 and 137, respectively, in preparation for another stretching and advancing operation. The severing blades 155 and 157 are then moved away from the planar strips to the position as illustrated in FIG. 3, and the punches 71 and 73 are moved upwardly or retracted thereby allowing unobstructed movement of the planar strips. The clamps or grippers 159 and 161 are also retracted so as to allow advancement of the connector strips into the securing station. The planar strips are then moved by movement of the step feeding unit 47 (FIG. 1) away from the securing station for positioning other sections of the planar strips at the securing and configuring stations. Other stretched portions of connector material for establishing additional connectors are also fed or advanced into the securing station substantially simultaneously with the movement of the planar strips by another stretching operation of the clamping units 123 and 129 (FIG. 1).

After leaving the securing station, the plurality of phase insulators 23 are moved by the planar strip feed unit 47 (FIG. 1) to an insulator accumulating means illustrated as take-up unit 173 in FIG. 2. As illustrated in FIG. 2, the phase insulators are still connected to each other by the planar interconnecting segments 29 extending between adjacent planar portions 25 of the phase insulators thereby allowing the phase insulators to be accumulated on the spool 31. The phase insulators will be subsequently severed at another location prior to their placement into dynamoelectric machine cores. Of course, if desired, the planar interconnecting segments can be severed to establish discrete or unconnected phase insulators by a cutting means such as, for example, cutting units 175 and 177 illustrated in FIG. 14. In the illustrated arrangement of FIG. 1, the mounting supports 179 and 181 are provided for mounting the cutting or severing units with the planar portions of the phase insulators being fed through the cutting units for severing the interconnecting planar segments thereby establishing discrete or unconnected phase insulators.

It also will be noted that the phase insulator planar portions may (if desired) be "configured" at a severing station by the cutting units 175, 177 whether or not the planar material is actually "severed" at such severing station. If this type of procedure is followed, the configuring means 37 (see FIG. 3) will of course either be disabled or removed.

In more detail, as shown in FIG. 1, the two planar strips 33 and 35 are supplied to the configuring station 37 of the apparatus 21 from a planar strip supply means illustrated as the two spools or stock reels 43 and 45. The two stock reels are identical and are mounted substantially identically except that the stock reel 45 is supported on fixed plate 183 and the stock reel 43 is supported on the movable plate 185; thus, the description will be in terms of stock reel 43. The stock spool 43 comprises side 187 having flanged bearing unit 189 secured thereto and side 191 having flange 193 secured thereto. The bolt 195 is welded to the flange 193 and extends through the flanged bearing unit and has nut 197 threaded thereon for holding the two spool sides together. The spool is supported by support arm 199 which is bolted to the movable plate 185 by bolt 201. A pivot pin 203 also extends through the support arm into the movable plate. The planar strip 33 is retained in coiled form between the two spool sides and rotates about the flanged bearing unit as the planar strip is pulled through the apparatus. A new supply of planar strip material is installed on the spool by removing the bolt 201 and pivoting the spool about the pivot pin 203. The retaining nut 197 is then unthreaded allowing removal of the spool side 191 thereby permitting a new supply of planar material to be placed between the spool sides.

The planar strips 33 and 35 are supplied along guide supports 205 and 207 which are attached to the movable plate 185 and the fixed plate 183, respectively. As can be seen more clearly in FIG. 4, the guide supports extend beyond the securing station 39 to the planar feed unit 47. The two planar strips are guided along their respective guide support by a guiding means, illustrated as the guide plates 87 and 89 positioned on top of the guide supports 205 and 207, respectively. As can be seen in FIG. 1, the guide plates 87 and 89 are provided with channel-shaped recesses 213 and 215, respectively therein for accommodating and guiding the respective planar strip along the respective guide support.

As illustrated in FIG. 4, the guide plate 87 is held in position on the guide support 205 by clamps 217 and 219 which are moved into engagement with the guide plate by cylinders 221 and 223, respectively. The guide plate 89 is held in position on the guide support 207 by clamps 225 and 227 which are moved into engagement with the guide plate by cylinders 229 and 231, respectively. The clamps are identical to each other. As shown in FIG. 1 for the clamp 225, each clamp is provided with an angle portion 233 extending downwardly along the inner edge of its respective guide plate and guide support for positioning of each guide plate relative to its guide support. The angle portion 233 of the clamps 217 and 225 also actuates not shown limit switches when the clamps are in their down or clamping positions. Operation of the apparatus is prevented if either of these limit switches are not actuated indicating that one or both of the guide plates are not clamped or improperly positioned causing a failure to clamp properly. In order to further assure proper positioning of the guide plates, each clamp is provided with two locating pins 235 and 237, as illustrated in FIG. 4, mounted therein which are received within corresponding recesses within the respective guide plates. A longitudinally extending recess 239 is also provided in each guide plate which interfits or slides about a screw 241 within each guide support and thus, further assuring transverse alignment or positioning of the guide plates. As also can be seen in FIG. 4, each guide plate is provided with a cut out portion 243 at the configuring station 37 for allowing access to the planar strip by the configuring devices 99 and 101, and a reduced width portion 245 at the securing station 39 for performing the securing operation as will be discussed more fully hereinbelow.

If it is desired to fabricate phase insulations having planar portions of different widths, the different width planar strips may be fed through the apparatus by replacing the guide plates 87 and 89 with guide plates having appropriate recess portions for guiding the planar strips of desired width. The changeover to the different guide plates may be easily accomplished by releasing the clamps 217, 219, 225, and 227 by retracting the cylinders 221, 223, 229, and 231 respectively. The planar supply reels 43 and 45 (FIG. 1) may be pivoted away from each other so as to allow removal of the guide plates. New guides can then be slid into position on their respective guide supports and then retained in position by operation of the clamps.

Referring to FIGS. 1 and 4, a planar strip supply monitoring means, illustrated as including the two limit switches 91 and 93, is provided for monitoring the supply of planar strip material and stopping operation of the apparatus when the supply of one or both of the planar strips has been exhausted. Actuating arm 95 of the limit switch 91 extends within recess 247 of the guide plate 87 and the guide support 205, and rests upon the planar strip 33. An absence of the planar strip material 33 causes the actuating arm 95 to actuate an electrical contact within the limit switch to stop operation of the apparatus until a new supply of planar strip material has been loaded onto the supply reel or spool 43 (FIG. 1). The limit switch 93 has an actuating arm 97 positioned within recess 249 of the guide plate 89 for monitoring the supply of the planar strip 35 in the same manner.

As shown in FIG. 1, the configuring station 37 includes the two configuring devices 99 and 101 which are attached to the movable plate 185 and the fixed plate 183, respectively. The configuring devices are substantially simultaneously operated by actuation of the cylinders 251 and 253, respectively. Operation of the cylinders causes the punches 71 and 73 of the configuring devices 99 and 101, respectively, to move downwardly and shear or cut their respective planar strip in the configuration illustrated in FIG. 4. As illustrated in FIG. 2, this shearing or configuring operation establishes the demarcation between adjacent planar portions 25 of adjacent phase insulator 23 and establishes a desired contour for such planar portions. The planar strips are not completely severed during the configuring operation, that is, planar interconnecting segments 29 remain for interconnecting adjacent planar portions of the phase insulators. The interconnecting segments allow continued movement of the planar strips through the apparatus and allow accumulation of the phase insulators on a take-up reel such as, for example, reel 31 of FIG. 2. It is again noted that the configuring operation may be performed at locations along the apparatus other than those shown in FIGS. 1 and 3.

Figure 5:
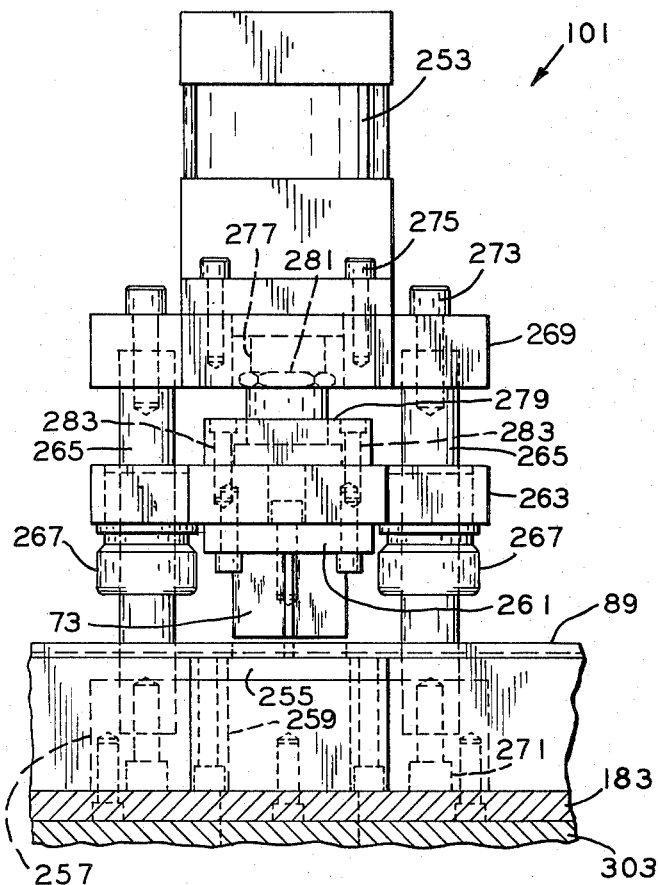
FIG. 5 is an elevational view taken between the two planar strips at the configuring station of FIG. 1, and, more specifically is a view taken along lines 5—5 in FIG. 4, with this view (FIG. 5) illustrating one of the two configuring devices.

The two configuring devices 99 and 101 are identical; thus, only configuring device 101 will be described in reference to FIG. 5. As illustrated in FIG. 5, the configuring device 101 includes a die block 255 bolted to die bolster 257. The die block is preferably fabricated from hardened and drawn steel. The die block is provided with a shearing surface which is contoured in a notch-like configuration to correspond with the contour of the punch 73 (as illustrated in FIG. 4). The die bolster is provided with an opening 259 therein for allowing sheared or cut material portions to drop therethrough. The punch 73 (also see FIG. 4) has its base plate 261 bolted to punch holder or plate 263 and is preferably formed from hardened and drawn steel. The punch holder or plate 263 is movably mounted on four guide and support rods 265 (also see FIG. 1) with four bushings 267 being provided to facilitate movement along the rods. The guide and support rods extend between the die bolster 257 and a top support plate 269 with bolts such as, for example, 271 and 273 securing the support rods to the die bolster and the top support plate, respectively. The air cylinder 253 is supported on the top support plate and bolted thereto by screws such as, for example, cap screw 275 with the cylinder rod 277 being connected to the punch holder plate 263 by way of cylinder adapter 279 including jam nut 281 and bolts 283. Thus, extension of the cylinder rod causes downward movement of the punch holder 263 along the guide rods 265 for shearing or cutting a notch-like portion from the planar strip 35 (FIG. 1) positioned within the guide plate 89. Of course, a differently configured punch and die combination could be utilized to obtain other desired configurations in the planar strips. Still further, it can readily be appreciated that additional configuring devices can be provided in the apparatus 21 (FIG. 1) to obtain still other desired configurations for the planar strips.

As discussed previously in reference to FIGS. 2 and 3, each phase insulator 23 has two connectors 27 secured to the two planar portions 25 of the insulator at the securing station 39. The connector may be formed of a filamentary or polyester monofilament material. As shown in FIG. 1, the two filamentary strips 67 and 69 of connector material are supplied to the securing station by way of the stretching or conditioning station 115. At the conditioning station, the filamentary strips are stretched or elongated by a predetermined amount so as to remove curvature or "set" from the filamentary strips. Removal of the curvature or "set" assures that connectors produced therefrom will be straight and thus, facilitate automatic or machine insertion of the resulting phase insulators into dynamoelectric machine cores. The filamentary strips of connector material are supplied to the conditioning station by a supply means illustrated as including the two spools or stock reels 111 and 113. As illustrated, the two spools 111 and 113 are positioned within support devices 285 and 287, respectively, with each spool resting upon rollers such as, for example, the rollers 117 and 119 to allow rotation of the spools for removal of the respective filamentary connector strip therefrom.

Figure 6:
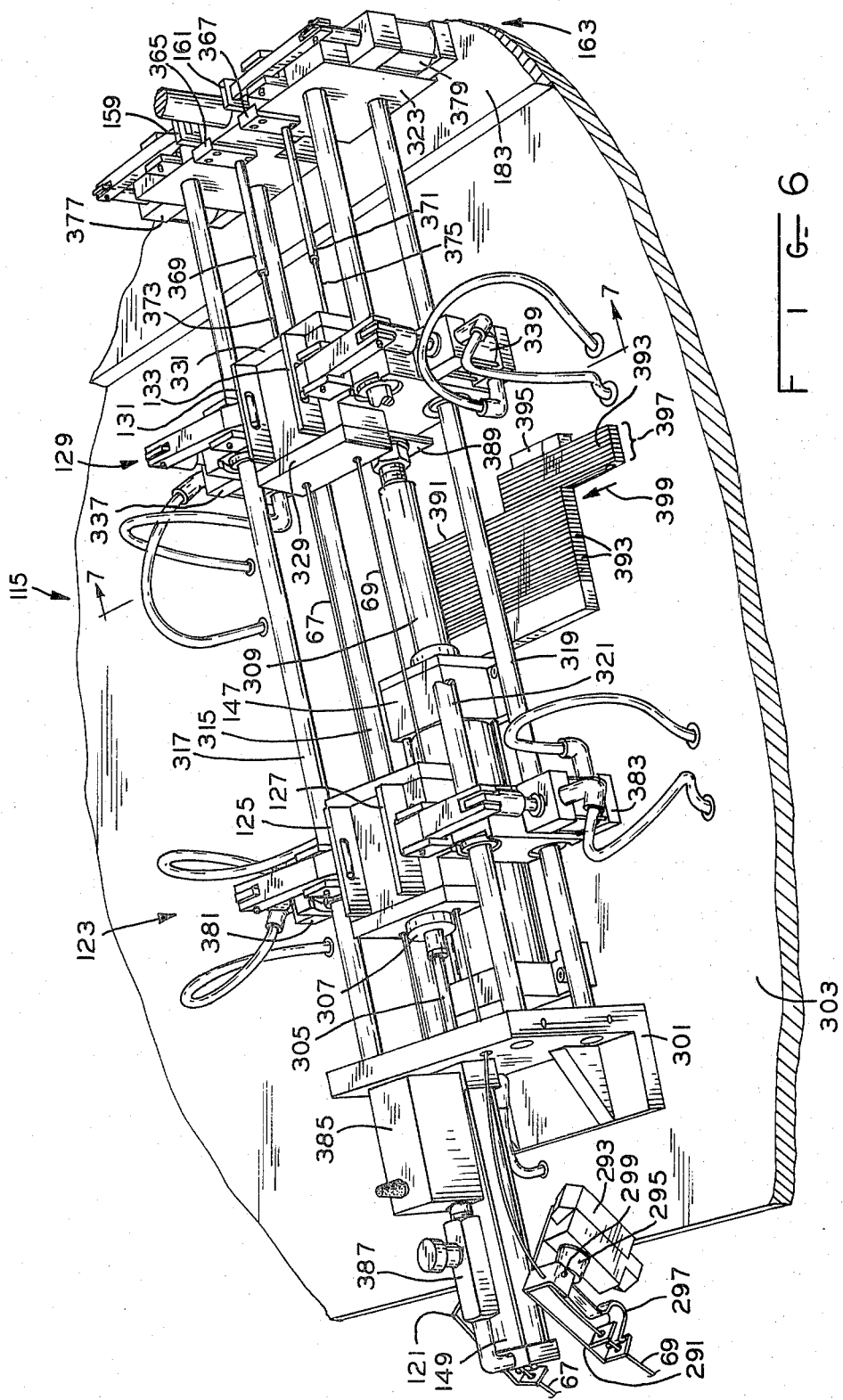
FIG. 6 is a perspective view of the stretching station illustrated in FIG. 1, this FIG. 6 being the view that would be seen looking at the apparatus of FIG. 1 generally from the left rear thereof as it appears in FIG. 1.

Referring to FIG. 6, the connector strips 67 and 69 are supplied through the connector supply monitoring devices 121 and 291, respectively, prior to their being supplied to the conditioning or stretching station 115. The two supply monitoring devices are identical; thus, only supply monitor device 291 will be described. The supply monitoring device 291 comprises a limit switch 293 having an actuator 295 operated by actuating arm 297 which is pivotally mounted about point 299. The strip 69 of connector material holds the actuating arm in the position illustrated in FIG. 6 to keep the limit switch actuated as long as connector strip material is being fed therethrough. Upon an absence of connector strip material, the actuating arm moves away from the actuator thereby deactuating the limit switch and operating an electrical contact of the limit switch for stopping operation of the apparatus until a new spool or supply of connector material has been loaded onto the machine.

As illustrated in FIG. 6, the stretching station 115 includes the first clamping device 123 which is connected to the stretch cylinder 149 mounted onto support plate 301 which is attached to apparatus support base or table 303. The stretch cylinder rod 305 is secured to the first clamping device by cylinder adaptor 307 for causing movement of the first clamping device. The stretching station also includes the second clamping device 129 which is connected to the advancing cylinder 147 mounted on the apparatus support base. The advancing cylinder rod 309 is secured to the second clamping device by opposing washers 311 and nuts 313 (FIGS. 4 and 7) for causing movement thereof. The first and second clamping devices are movable along four support and guide rods 315, 317, 319, and 321 which are supported by and extend between the support plate 301 and the support block 323 of the third clamping device 163.

Figure 7:
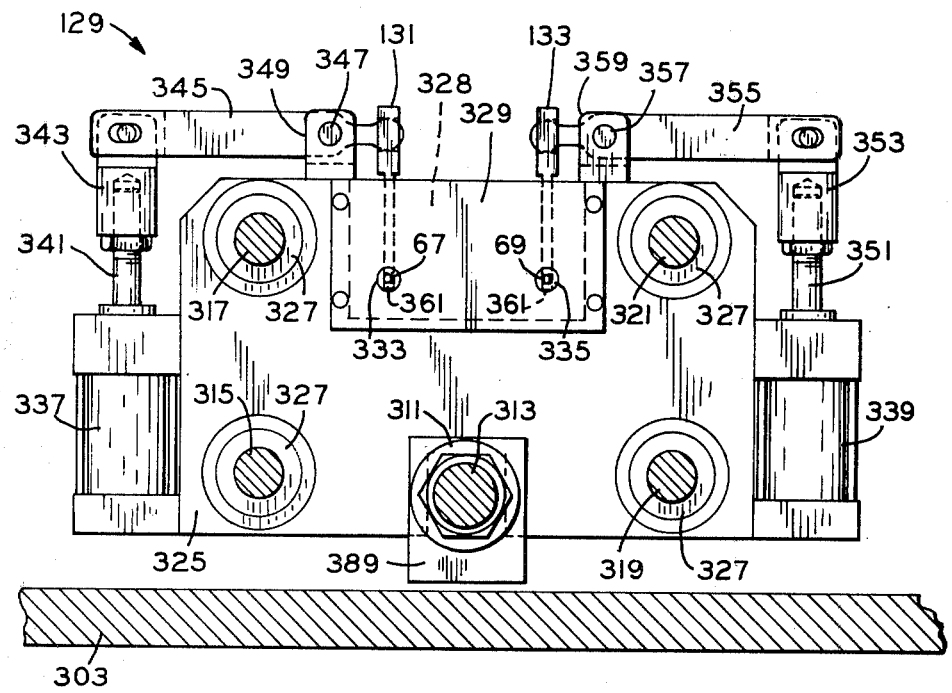
FIG. 7 is a front elevational view of a second clamping device located at the stretching station illustrated in FIG. 1 and taken in the direction of lines 7—7 in FIGS. 1 and 6.
Figure 8:
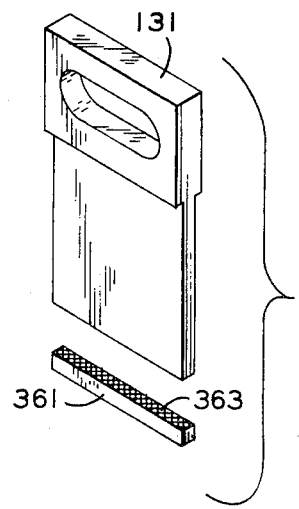
FIG. 8 is a perspective view of a clamping blade and serrated insert of the clamping device of FIG. 7.

The first and second clamping devices 123 and 129 are substantially identical except for orientation of serrated inserts therein as will be discussed more fully hereinbelow; thus, only the details of the second clamping device 129 will be described in reference to FIGS. 6, 7, and 8. As illustrated in FIG. 7, the second clamping device comprises a carrier block 325 having openings therethrough for accommodating four ball bushings 327 (also see FIG. 4) disposed between the carrier block and the guide rods 315, 317, 319, and 321.

The carrier block has a blade accommodating insert 328 mounted therein with the insert having vertically extending slots for accepting clamps or gripping blades 131 and 133, respectively, therein. Two oppositely disposed caps or guide devices 329 and 331 (see FIG. 6) are also secured to the carrier block with each being provided with apertures therethrough such as, for example, the apertures 333 and 335 illustrated for the cap 329 therein for guiding the strips 67 and 69, respectively, of connector material into and out of the respective slots of the blade accommodating insert. The apertures of the caps are generally circular in shape; however, the apertures may be provided with tapered or funnel shaped entrances to facilitate guiding of a connector strip. The grippers or clamping blades 131 and 133 are moved vertically into and out of engagement with the connector strips 67 and 69, respectively, by operation of air cylinders 337 and 339, respectively, which are attached to the carrier block. The rod 341 of the cylinder 337 and the gripper blade 131 are interconnected by way of cylinder adapter 343 and lever 345 with the lever being pivotally mounted about pin 347 which extends through the lever and pivot block 349. Thus, extension of the cylinder rod 341 causes the lever 345 to be pivoted about the pin 347 thereby moving the gripper blade 131 downwardly into a gripping or engagement position with the connector strip 67. The rod 351 of the cylinder 339 and the gripper blade 133 are similarly connected by way of cylinder adapter 353 and lever 355 with the lever being pivotally mounted about pin 357 which extends through the lever and pivot block 359. Extension of the cylinder rod 351 causes the lever 355 to be privoted about the pin 357 thereby moving the gripper blade 133 downwardly into gripping engagement with the connector strip 69.

As also illustrated in FIG. 7, two removable inserts 361 are mounted at the bottom of the slots of the blade accommodating insert 328. As illustrated more clearly in FIG. 8, each removable insert 361 is provided with a serrated surface 363. The serrations facilitate gripping or entrapment of a filamentary connector strip between a gripper blade such as, for example, the illustrated gripper blade 131 and the insert. The serrations are of such a configuration and depth as to facilitate gripping, but not of sufficient depth as to cause damage to the connector material. For example, serrated inserts have been used which were fabricated from sections of a standard eight inch mill bastard file. As mentioned previously, the serrated inserts are oriented differently in the first clamping device 123 (FIG. 1) from the orientation of the serrated inserts of the second clamping device 129 (FIG. 1). In the first clamping device, the inserts are positioned therein so that serrations or teeth thereof are oriented in a direction toward the connector supply spools 111 and 113 (FIG. 1) thereby tending to hold back the connector strips to facilitate stretching. In the second clamping device, the serrated inserts are positioned therein so that serrations or teeth thereof are oriented in a direction toward the securing station thereby tending to pull or advance the connector strips toward the securing station during the stretching operation.

FIG. 6 also illustrates the third clamping device 163 which is substantially similar to the previously described first and second clamping devices 123 and 129, respectively. The third clamping device is provided with the two clamping or gripping bars 159 and 161 accommodated within corresponding slots in the support block or plate 323. Four cap plates 365, 367, and two hidden from view cap plates disposed opposite the cap plates 365 and 367 are attached to the support block 323. The cap plates have apertures therethrough for guiding the filamentary connector strips 67 and 69 into and out of the slots of the support block. As shown, the two cap plates 365 and 367 support two guide tubes 369 and 371, respectively through which the connector strips 67 and 69, respectively, are fed. The connector strips 67 and 69 are also fed through guide tubes 373 and 375, respectively which are attached to the cap 331 and which are movable within the guide tubes 369 and 371, respectively as the second clamping device 129 is being moved. A removable insert (substantially identical to the insert 361 shown in FIG. 8) with serrations thereon oriented toward the securing station, is also provided within each slot to facilitate gripping or entrapment of the respective connector strips as described in reference to FIGS. 7 and 8. The gripper or clamping bars 159 and 161 are moved vertically into and out of engagement with the connector strips 67 and 69, respectively, by operation of air cylinders 377 and 379, respectively, which are attached to the support block 323. The air cylinders 377 and 379 are interconnected with the clamps or clamping blades 159 and 161, respectively, in the same manner that the cylinder 337 and the clamp 131 are interconnected as previously described in reference to FIG. 7. In one actual reduction to practice, Tiny Tim air cylinders model VTF having a one and one-eighth inch bore, three-eighths inch rod diameter, and a one-half inch stroke were utilized to operate clamps of the first, second and third clamping units and clamps of the planar feed unit. All of the cylinders were supplied with a line air pressure of approximately 95 psi, except the cylinders of the third clamping unit which were supplied with regulated air pressure of approximately 30 psi.

As shown in FIG. 6, the connector strips 67 and 69 extend through the first clamping device 123 and the second clamping device 129; through guide tubes 373 and 369 and guide tubes 375 and 371, respectively; and through the third clamping device 163 into the securing station 39 (FIG. 1). In FIG. 6, the clamping devices are illustrated as having completed a stretching and advancing operation. The clamping bars 125 and 131 are in engagement with the connector strip 67 and the clamping bar 159 is out of engagement with the connector strip. Similarly, the clamping bars 127 and 133 are engaged with the connector strip 69 and the clamping bar 161 of the third clamping device is out of engagement with the connector strip.

In operation of the stretching and advancing device from the position illustrated in FIG. 6, the clamping bars 159 and 161 are moved into engagement with the connector strips 67 and 69, respectively, by extending the air cylinders 377 and 379, respectively. The clamping bars 125, 127, 131 and 133 are moved out of engagement with their respective connector strip by retraction of air cylinders 381, 383, 337 and 339, respectively. Clamping of the respective connector strips by the clamps 159 and 161 prior to retraction of the clamps of the first and second clamping devices prevents retraction or spring back of the connector strips when the clamps of the first and second clamping devices are retracted. The stretch cylinder 149 has a predetermined retraction pressure such as, for example, 60 psi being constantly applied thereto. Thus, when the clamping bars 125 and 127 are moved out of gripping engagement with the connector strips 67 and 69, respectively, the first clamping cylinder moves back along the guide rails 315, 317, 319 and 321 until the clamping device engages the support 301. An oil reservoir unit 385 and flow control valve 387 are provided to control retraction movement of the stretch cylinder so as to prevent slamming of the first clamping unit against the support 301. The second clamping unit is retracted by retracting the advancing cylinder 147 causing the second clamping unit to move back along the guide rails until stop 389 engages surface 391 of the of the plurality of spacers 393. With the stretch and advancing cylinders retracted, the cylinders 381 and 383 of the first clamping device and the cylinders 337 and 339 of the second clamping device are extended to move each of the grippers 125 and 127 and grippers 131 and 133, respectively, into engagement with their respective connector strip. The cylinders 377 and 379 of the third clamping device 163 are subsequently retracted to disengage the grippers 159 and 161 from their respective connector strips. As mentioned previously, a predetermined retaining air pressure is supplied to the stretching cylinder 149 to maintain the stretching cylinder in its retracted position. The second clamping device is moved along the guide rails by applying air to the advancing cylinder 147 to cause extension of the cylinder rod 309 for moving the second clamping device to the position illustrated in FIG. 6. As the second clamping device is being moved or advanced, the portions of the connector strips which are trapped or confined between the first and second clamping devices are pulled or stretched. Such stretching causes elongation of the connector material and removal of curvature or "set" existing in that portion of the material located between the two clamping devices. As illustrated, the first and second clamping devices are interconnected by the connector strips; thus, as the second clamping device is advanced, the retraction or restraining force being applied to the stretched cylinder of the first clamping device is overcome thereby pulling or causing movement of the first clamping device along the guide rods or rails to the illustrated position.

As is apparent, movement of the second clamping device by the advancing cylinder 147 also causes previously stretched portions of the connector strips extending through the respective guide tubes and the third clamping device to be advanced (i.e., pushed) toward the securing station 39 (FIG. 1) with elongated segments or portions 151 and 153 (FIG. 3) thereof, moving into the securing station. The clamping cylinders 377 and 379 of the third clamping device are again operated or extended for causing the grippers 159 and 161, respectively, to once again engage their respective strip of connector material. The grippers of the third clamping device hold the connector strips in position thereby allowing release of the connector strips by the grippers of the first and second clamping devices during their previously described retraction operation in preparation for another stretching operation.

As also shown in FIG. 6, a means is provided to adjust the length of connectors 27 (FIG. 2) being fabricated so as to allow fabrication of phase insulators for magnetic cores having different stack heights or axial lengths. As mentioned previously, movement of the second clamping device 129 toward the securing station causes advancement of previously stretched portions 151 and 153 (FIG. 3) of the connector strips 67 and 69, respectively, into the securing station for severing and connection between the spaced-apart planar portions 64 and 66 (FIG. 3). The distance of advancement of the second clamping unit determines or sets the length of the portions of the connector strips being advanced into the securing station. Thus, greater or lesser lengths of the connector strips can be advanced into the securing station by varying the stroking distance of the advancing cylinder 147. The plurality of slotted spacers 393 provide a means of controlling the amount or length of the connector strips being advanced to the securing station by controlling the retraction distance of the advancing cylinder. The spacers are slideably mounted about member 395; thus, one or more of the spacers within the group generally designated by the reference numeral 39 may be slid in direction 399 so as to be within the path of the stop block 389 for causing advancement of lesser lengths of the connector strips. On the other hand, if greater lengths of the connector strips are desired, one or more of the spacers shown within the path of the stop may be slid to the position shown for the spacers within the group 397. Of course, when an adjustment of the spacers 393 is performed, a stator height adjustment mechanism 401 (FIG. 1) would also be adjusted, as discussed more fully hereinbelow, to adjust the separation distance between the two planar strips 33 and 35 (FIG. 1) in accordance with the stack heights of the magnetic cores into which the phase insulators are to be subsequently placed.

Figure 9:
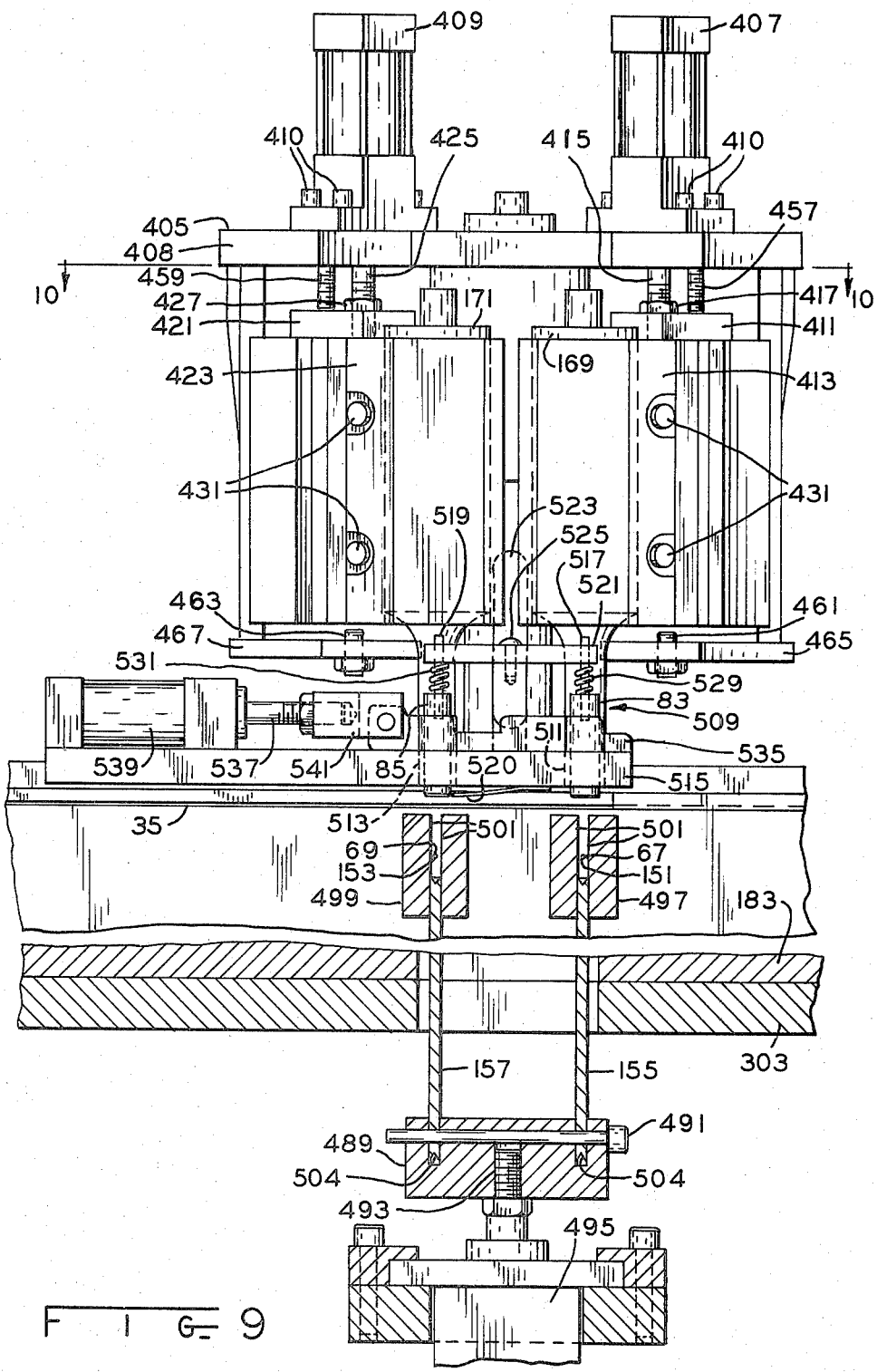
FIG. 9 is a cross-sectional view of the securing station of FIG. 1 taken longitudinally between the two planar strips of FIG. 1 and looking toward the stretching station, i.e., along lines 9—9 in FIG. 4.
Figure 10:
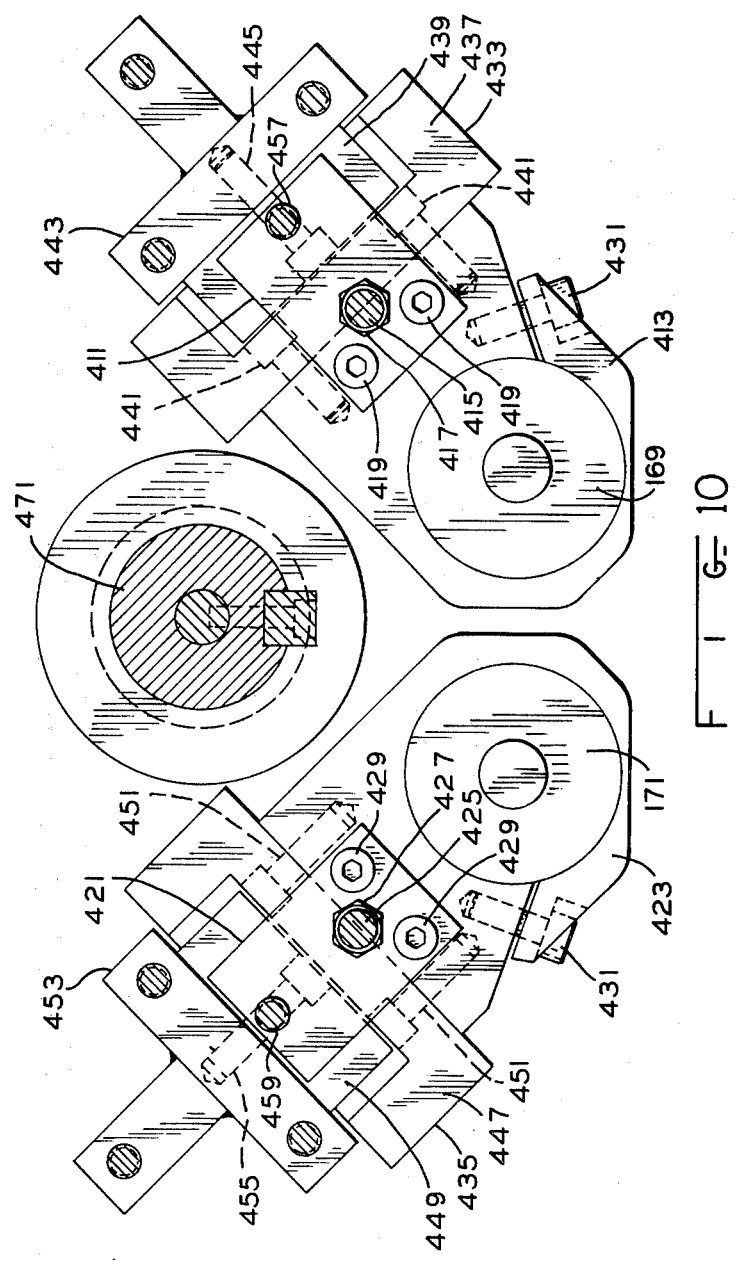
FIG. 10 is a cross-sectional plan view of an ultrasonic welding assembly of FIG. 9, taken along the lines 10—10 of FIG. 9.

Further details of the securing station 39 (FIG. 1) are illustrated in FIGS. 4, 9, 10, 11 and 12. As illustrated in FIG. 4, the securing station includes the four ultrasonic welders 165, 167, 169, and 171 for substantially simultaneously securing two connectors to the planar strips. Two identical mounting assemblies 403 and 405 are provided for accommodating the ultrasonic welders 165 and 167 and the ultrasonic welders 169 and 171, respectively; thus the description of the mounting of the welders will be primarily with respect to the mounting assembly 405 as shown in FIGS. 9 and 10.

Referring to FIG. 9, the ultrasonic welders 169 and 171 are illustrated in their retracted position, i.e., out of engagement with the planar strip 35. The welders 169 and 171 are moved into and out of engagement with the planar strip by operation of air cylinders 407 and 409, respectively. The air cylinders are secured to mounting plate 408 by bolts such as, for example, bolts 410. The cylinder 407 is interconnected with the welder 169 by way of plate 411 and welder cage 413. Rod 415 of the cylinder 407 is threadingly engaged with the plate 411 and held in position by nut 417, and the plate is secured to the welder cage by bolts 419 (FIG. 10). Similarly, the cylinder 409 is interconnected with the welder 171 by way of plate 421 and welder cage 423. Rod 425 of the cylinder 409 is threadingly engaged with the plate 421 by nut 427, and the plate is secured to the welder cage by bolts 429 (FIG. 10).

As shown in FIG. 10, the welders 169 and 171 are secured or clamped within their cages 413 and 423, respectively by bolts such as, for example, bolts 431. In order to accomplish movement of the welder cages and in turn, the welders, identical ball bearing slide units 433 and 435 are provided. The bearing unit 433 comprises a movable, channel shaped bearing member 437 and fixed inner member 439. The movable member 437 is secured to the welder cage 413 by bolts such as, for example, bolt 441. The fixed bearing member 439 is secured to support 443 by bolts such as, for example, bolt 445. Similarly, the bearing unit 435 comprises a movable, channel shaped bearing member 447 and a fixed inner member 449. The movable member 447 is secured to the welder cage 423 by bolts such as, for example, bolts 451. The fixed bearing member 449 is secured to support 453 by bolts such as, for example, bolt 455. In the above-mentioned actual reduction to practice, the ultrasonic welders were Branson Sonic Power TWI Converters No. 100-135-015 which had power supplied thereto by Branson E150A Power Supply No. 101-132-066. The bearing units were ball slide Yankee Clipper models Y3-20 manufactured by Design Components, Inc. The air cylinders for moving the welders such as, for example, air cylinders 407 and 409, were Tiny Tim Models VT-FR having a three-fourths inch bore and a one inch stroke.

Referring again to FIG. 9, the welding assembly 405 is also provided with a means for adjusting the travel distance of each of the welders 169 and 171. Upper stops 457 and 459, which are threaded through the top support plate 408, limit the upward travel or retraction of plates 411 and 421 and thus also the travel of the welders 169 and 171, respectively by engagement with plates 411 and 421, respectively. Lower stops 461 and 463 which are threaded through support plates 465 and 467 limit the downward travel or extension of the welders 169 and 171, respectively, by engaging the cages 413 and 423, respectively. It will be understood that the assemblies 403, 405 are supported on sleeves 810, 811 which are assembled on posts 469, 471 with a slip fit. The sleeves 810, 811 are fastened to base plates of the assemblies 403, 405 by welds at the upper end thereof, and bolts 812, 814 hold the assemblies 403, 405 to the posts 469, 471.

Figure 11:
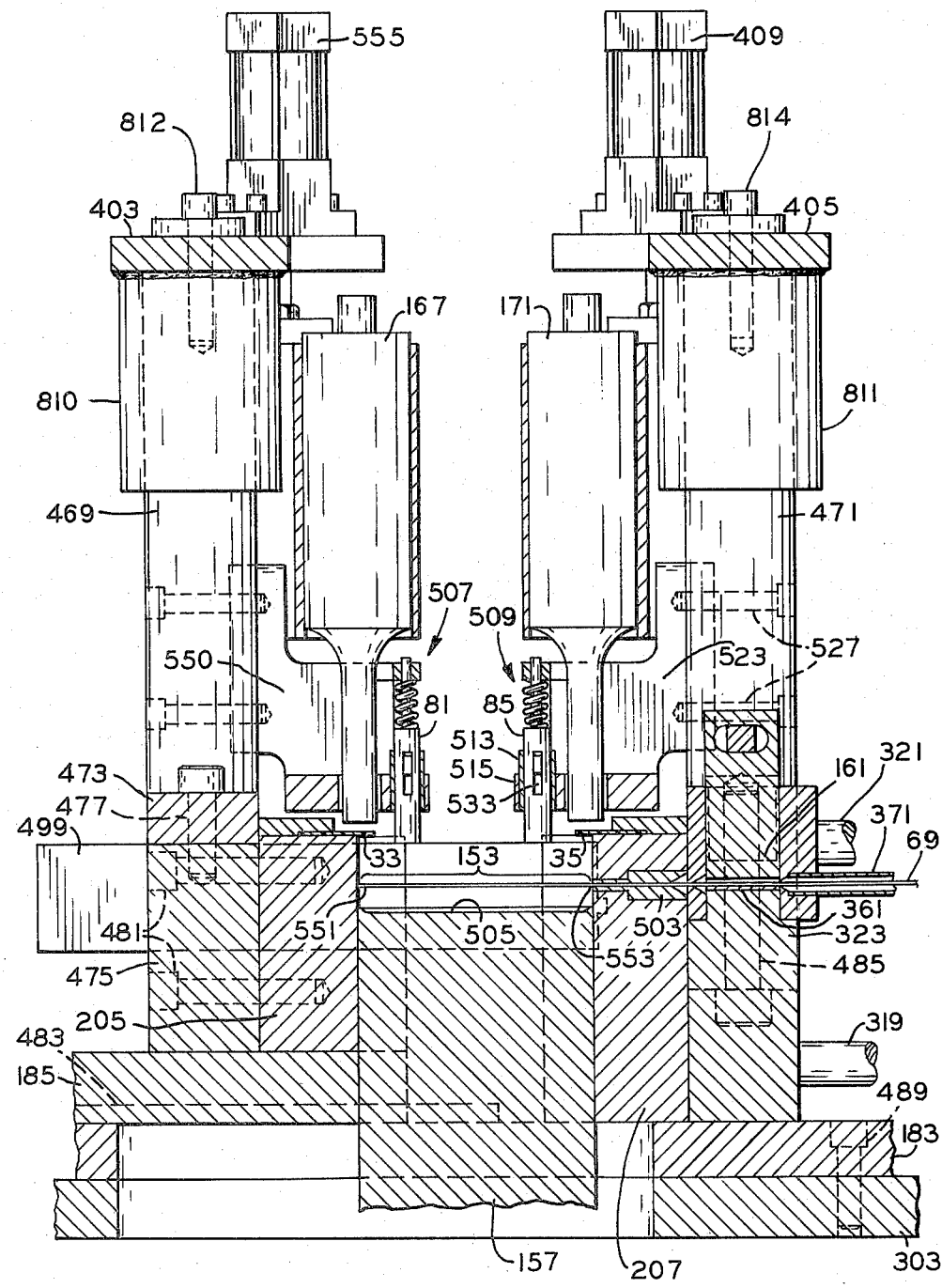
FIG. 11 is a cross-sectional view of the securing station of FIG. 1 taken transverse to the planar strips and looking toward the feed unit of FIG. 1, this FIG. 11 being a view taken approximately along the lines 11—11 of FIG. 4 and also showing some parts in full rather than in cross-section.

As shown in FIG. 11, the welder assemblies 403 and 405 (partially illustrated) are supported on posts 469 and 471, respectively. The post 469 is secured by suitable means (e.g., by welding or bolting) to plate 473 with the plate 473 being secured to the post support 475 by, for example, bolt 477. The post support is secured horizontally, as viewed in FIG. 11, to the strip guide support block 205 by bolts such as, for example, bolts 481. The block 205 is in turn attached (e.g., by bolts or by welds) to the movable plate 185. Thus, the separation distance between the two welder assemblies may be varied by moving the movable plate 185 along its guide plates, such as for example, the illustrated guide plate 483 so as to allow fabrication of phase insulators for dynamoelectric machine cores having different stack heights or axial lengths. The post 471 for supporting the welder assembly 405, is secured to the support block 323 by bolt 485. The support block 323 is secured to the strip guide support block 207 by not shown bolts. Block 207 in turn is attached to the fixed plate 183 by bolting preferably, or by welding. The fixed plate 183 is secured to the apparatus base or table 303 by bolts such as, for example, the illustrated bolt 489. The strip guide support blocks 205 and 207 are provided with slots for guiding the severing blades therein. It is preferred to fabricate the guide support blocks in sections with the sections utilized at the securing station being fabricated from a bearing material such as, for example, bronze to facilitate guiding of the severing blades therein.

The securing station also includes a connector severing and positioning means illustrated as the two identical blades 155 and 157 shown in FIG. 9. The two blades are mounted within slotted holder 489 and held therein by removable pins such as, for example, pin 491. The slotted holder is threadingly attached to rod of blade cylinder so as to provide simultaneous movement of the blades 155 and 157 between the blade guides 497 and 499, respectively. The inner surfaces 501 of the blade guides are provided with a finish such as, for example, bronze, to facilitate movement of the respective blades therein.

As mentioned previously, portions of the two filamentary connector strips of connector material are advanced into the securing station 39 (FIG. 1) after having been stretched or elongated at the conditioning or stretching station 115 (FIG. 1) to remove curvature or set from the connector strips. The two connector strips are fed or advanced in an identical manner through identical elements; thus, the description will be primarily in terms of the feeding of the connector strip 69 as illustrated in FIG. 11. The filamentary connector strip 69 is advanced into the securing station through the guide tube 371; underneath the clamp blade 161; through cut-off insert 503; and into position within the blade guide 499 (also see FIG. 9) above the severing and guide blade 157. With the connector strip portion 69 in position over the severing blade 157, the blade cylinder 495 (FIG. 9) is actuated causing upward movement of the blade. The upward movement of the blade causes the previously elongated portion 153 to be severed thereby establishing a connector or connector segment which has been previously elongated for subsequent securing to the two planar strips 33 and 35. It is preferred to fabricate the severing blades and the cut-off inserts, such as for example, the cut-off insert 503 from hardened steel. As can be seen more clearly in FIG. 12 for the blade 157, each of the severing blades is provided with a groove 505 in the top portion thereof for accommodating the severed connector portion. The groove facilitates positioning of a connector segment in a securing position adjacent to the two planar strips.

Each severing blade is provided with a mounting aperture 502 for receiving the mounting pin 491 (FIG. 9). In order to maximize the flexibility and useful life of a severing blade, each severing blade is also provided with a second groove 504 (FIG. 9) in the bottom portion thereof and a second mounting aperture 506. Thus, the severing blade may be turned upside down thereby allowing utilization of the second groove or the severing blade may be turned end to end. Thus, by reorienting the severing blade within the blade holder 489 (FIG. 9), either of four different edges of the blade is usable for severing a connector strip.

As also illustrated in FIG. 11, two connector retaining devices 507 and 509 are also provided at the securing station to assure proper positioning and retention of two connector segments adjacent to the planar strips for the welding operation. The retaining devices are identical; thus, the description of the devices will be primarily in terms of the retaining device 509 illustrated more completely in FIG. 9. Referring to FIG. 9, the retaining device 509 includes the two spring-loaded fingers or retainers 83 and 85 movable within bronze bushing bearings 511 and 513 which are secured within mounting support 515 (also see FIG. 11). The retainers 83 and 85 are threadingly connected to pins 517 and 519, respectively with the pins being slideably mounted within plate 521. The plate 521 is secured to support bracket 523 by bolt 525, and the support bracket is attached to the post 471 by bolts 527 (FIG. 11). The retainers 83 and 85 are spring-loaded by compression springs 529 and 531, respectively, disposed about the pins 517 and 519, respectively. The retainer 85 is provided with a shoe or connector deflection plate 520 secured to the tip thereof by, for example, soldering. The deflection plate which extends toward the retainer 83 deflects connectors which may be buckled inadvertently, and thus, the deflection plate minimizes the possibility of a connector hanging up on the retainer 85 as the welded together planar strips and connectors are moved away from the securing station. The retainers 83 and 85 are also each provided with slots or openings such as, for example, slots 533 (FIG. 11), for movement of cam 535 therein. The bearings 511 and 513 are also provided with not shown slots for allowing horizontal movement of the cam 535 therein. The cam 535 which extends through the bearings, is connected to actuating rod 537 of the cam cylinder 539 by way of adapter connection 541 and is slidable relative to the mounting plate or support 515. The cam cylinder is retracted from the position illustrated in FIG. 9 for causing downward movement of the retainers or fingers 83 and 85 to a position as illustrated in FIG. 11. Retraction of the cam cylinder moves or retracts the cam back through the slots in the retainers and the bearings thereby causing the compression springs to move the retainers 83 and 85 downwardly so as to engage or rest upon guide plates 497 and 499, respectively. The retainers 83 and 85 aid in the retaining positioning of one end of two different severed connectors adjacent to the planar strip 35 for the securing or welding operation. Opposite ends of the two connectors are simultaneously positioned and retained adjacent to the planar strip 33 with the aid of the retaining device 507 which is identical to the retaining device 509 except for being a mirror image thereof. The retaining device 507 is also provided with two retainers (retainer 81 thereof illustrated in FIG. 11) which are held in their position by extension of cam cylinder 549 (FIG. 4) and which are moved downwardly by retraction of the cam cylinder in the same manner as the retainers 83 and 85. The retaining device 507 is supported by the post 469 by way of mounting bracket 550 in the same manner as the retaining device 509 is supported by the post 471.

The severing, positioning and securing of connectors to the planar strips will be described in terms of the connector or previously elongated portion 153 illustrated in FIG. 11. However, it is to be understood that the elongated portion 151 (FIG. 3) is being severed, positioned and secured simultaneously to the two planar strips 33 and 35 in the same manner. As shown in FIG. 11, the connector portion 153 of the connector strip 69 has been extended into the securing station. After the elongated portion has been extended or advanced to the illustrated position, the severing blade 157 is moved upwardly to sever the previously elongated connector portion thereby establishing a connector for securing to the planar strips. As shown, opposing retainers 81 and 85 of the retaining devices 507 and 509, respectively, are in an extended or down position for engaging the connector portion 153 and retaining the connector portion within the groove 505 of the severing blade 157. The severing blade continues its upward movement causing upward movement of the retainers and the severed connector portion until the severed connector portion is positioned adjacent the planar strips so that ends 551 and 553 thereof overlap their respectively planar strip. The severed connector is held in position by the severing blade and the retainers. The welding cylinders 555 and 409 are then actuated causing the welders 167 and 171, respectively, to move downwardly into engagement with the planar strips 33 and 35, respectively. The ultrasonic welders transmit ultrasonic vibrations to their respective planar strips and to respective ends of the connector to cause fusing or welding of the planar strips to respective ends of the connector. In the actual reduction to practice mentioned previously, the welder cylinders were Tiny Tim air cylinder Model VTFR having a three-fourths of an inch bore and one inch stroke, and a regulated welding air pressure of 22 psi was supplied to the welding cylinders. The welders were held in engagement with their respective planar strip for approximately one and one-half seconds.

After the securing or ultrasonic welding operation has been completed, substantially simultaneously, the four welders 165, 167, 169 and 171 (FIG. 4) are moved out of engagement with their respective planar strip by retracting the air cylinders 557, 555, 407, and 409 (FIG. 4), respectively; the retainers 79, 81 and the retainers 83, 85 (FIG. 3) held in an up position by extension of the cam cylinders 549 and 539 (FIG. 4), respectively; the connector strip clamping blades 125, 127, 131 and 133 (FIG. 6) are moved into gripping engagement with their respective connector strips by extension of the air cylinders 381, 383, 337 and 339 (FIG. 6), respectively, (the first and second clamping units 123 and 129, respectively, would be in their retracted position rather than in an extended position as illustrated in FIG. 6); and the clamping bars 63 and 65 (FIG. 1) are to be moved into engagement with the planar strips 33 and 35, respectively, by extending air cylinders 559 and 561, respectively, (it should be noted that the planar strip clamping units 53 and 55 would be in their extended position, i.e., nearer the securing station 39). Subsequent to the above-described operations, substantially simultaneously, the severing blades 155 and 157 (FIG. 9) are retracted by retracting the blade cylinder 495 (FIG. 3); the punches 71 and 73 (FIG. 4) are retracted or moved away from the planar strips 33 and 35 (FIG. 1) by retracting the air cylinders 251 and 253 (FIG. 4), respectively; and the clamping bars 159 and 161 (FIG. 6) of the third clamping unit 163 (FIG. 3) are moved out of engagement with the connector strips 67 and 69 (FIG. 6), respectively, by retracting the air cylinders 377 and 379 (FIG. 6), respectively. The apparatus 21 of FIG. 1 is then in position for feeding or pulling the planar strips so as to position different sections of the planar strips at the configuring station 37 and different sections at the securing station 39. The apparatus is also in position for performing another stretching operation upon the connector strips 67 and 69 at the stretching station 115 and for advancing previously elongated portions of the connector strips into the securing station. The pulling of the planar strips and the stretching and advancing of the connector strips occur substantially simultaneously.

Further details of the planar strip feeding unit 47 (FIG. 1) will be discussed in reference to FIGS. 1, 4 and 13. As shown in FIG. 1, the feeding unit 47 comprises the two feeding and clamping devices 53 and 55 for clamping and pulling the planar strips 33 and 35, respectively, through the phase insulation fabricating apparatus 21. The two clamping units are identical or mirror images of each other; thus, details of the clamping units will be discussed primarily in reference to the clamping unit 53 which is illustrated in further detail in FIG. 13.

Referring to FIG. 13, the clamping unit 53 comprises a support block 563 having openings therethrough for accommodating the guide rods 59 and 61. Four ball bushings 565 (also see FIG. 4) are mounted within the openings of the support block to facilitate movement of the support block along the guide rods. The support block has a bracket 567 which includes welded together members 569, 571, and 573, secured thereto by bolts such as, for example, bolt 575. Block 577, along which the clamp 63 is moved, is secured to the bracket 567, by bolts such as, for example, bolt 579, and has guide block 581 secured thereto by bolts such as, for example, bolt 583. The guide block has a recess therein for accommodating and allowing vertical movement of the clamp 63 therewithin. The clamp or clamping arm 63 is interconnected with the clamping cylinder 559 by way of lever arm 583. The lever arm is secured to the clamp arm by way of cap 587 and is pivotally mounted about pin 589 which extends through the lever and a pivot block 591. The lever is connected to rod 593 of the clamping cylinder 559 by adapter 595 with pin 597 extending through the lever and the adapter. Thus, extension of the rod 593 (shown extended in FIG. 13) by operation of the air cylinder 559 causes pivoting of the lever 583 about the pivot pin 589 thereby causing the clamp or clamping arm 63 to move downwardly to engage or grip a planar strip. A strip would be engaged by surface 599 of the member 569 and surface 601 of the clamp. The bottom clamping member or member 569 has tapered areas, as indicated by reference numeral 603 on opposite sides of the clamping surface 599 to facilitate guiding of a planar strip through the clamping unit. The clamping arm may be provided with an additional guiding means illustrated as lip 1605 to assure that a planar strip therein does not move horizontally as viewed in FIG. 13. However, it has been found that the connectors 27 (FIG. 2) secured between the two planar strips have proved sufficient in maintaining proper transverse separation between the two planar strips. As also shown in FIG. 13, the support block 563 has a slide block 605 attached thereto by bolts 607. The slide block has a "C" shaped configuration with opening 609 extending therethrough for accommodating slide bar 611 (FIG. 4) therein.

As illustrated in FIG. 1, the clamping unit 513 is supported by the guide rods 59 and 61 which are mounted between end supports 613 and 615. The end supports 613, 615 are attached to the movable mounting plate 185. Similarly, the clamping unit 55 is supported by guide rods such as for example, guide rod 617 (FIG. 4), which are mounted between end supports 619 and 621 (FIG. 4). The end supports 619 and 621 are secured to the fixed mounting plate 183. As illustrated in FIG. 4, the slide bar 611 extends between the clamping units 53 and 55. The slide bar is secured at one end thereof to the clamping unit 55 by block 623, and is slidably received within the slide block 609 of the clamping unit 53. The slide bar is attached to rod 625 of the feed cylinder 62 by way of adapter 627 for causing movement of both clamping units along their respective guide rails. Further, the slidable mounting of the slide bar within the slide block 609 permits the clamping unit 53 to be moved along the slide bar and thus, vary the separation distance between the two clamping units by moving the movable plate 185 (FIG. 1). Such an adjustment or movement of the movable plate is made to fabricate phase insulators for dynamoelectric machines having different stack heights or axial lengths.

In FIG. 4, the clamping units 53 and 55 are shown extended toward the securing station 39. The planar strips 33 and 35 (FIG. 3) would be moved or pulled along the apparatus by moving the clamping bars 63 and 65 into gripping engagement with their respective planar strip as illustrated in FIG. 3. The feed cylinder 62 would then be retracted to move the clamping units away from the securing station along their respective guide rails thereby pulling the respective planar strips through the apparatus so as to position other portions of the planar strips at the configuring and securing stations.

In the reduction to practice of the apparatus 21 (FIG. 1) described hereinabove, a Clippard Minimatic Sequence Timer No. MSP-12 with twelve C-33-15 programmer cams was utilized to control the described operational steps. Air output signals of the sequence timer or controller operated pneumatic valves which were connected to supply air to the cylinders for their retraction and extension in a manner described hereinabove. Solenoid valves operated by selector switches were also connected in air lines feeding the grippers or clamping blades of the three connector clamping units, the clamping blocks of the planar feed unit, and the configuring punches so as to allow manual selection retraction of the grippers and punches to permit threading or positioning of new supplies of planar strips and/or connector strips within the apparatus. A limit switch, programmed to operate once per cycle of the controller, was added and electrically connected with a relay so that the controller could only be stopped at the same point in its cycle except upon operation of an apparatus safety switch.

Upon leaving the securing station, the planar strips and connectors have a configuration as illustrated in FIG. 3; that is, a plurality of phase insulators 23 have been fabricated having two oppositely disposed planar portions 25 interconnected by two connectors 27 with the connectors being secured to the planar portions by ultrasonic welding. The phase insulators are interconnected with each other by planar interconnecting segments 29. Repeated intermittent or step-like movement of the planar strips longitudinally along the apparatus by the feed unit 47 (FIG. 1) moves the completed phase insulators beyond the feed unit along plates 629 and 631 (FIG. 1) and off the of the apparatus 21 (FIG. 1).

After leaving the apparatus, the phase insulators 23 are accumulated on the take-up unit 173 as illustrated in FIG. 2. The take-up unit includes the take-up reel 31 interconnected with motor 633 through a gear ratio unit 635 and clutch unit 637 with the take-up unit being mounted on support stand 639. Counterweight or dancer arm 641 is provided for sensing the loop or accumulation of the interconnected phase insulators.

The arm is provided with a roller 643 at one end thereof which rides on the plurality or chain of interconnected phase insulators. The arm 641 also is provided with a not shown counterweight attached to the other end thereof to control the weight or force being applied to the loop of phase insulators by the roller, and thus, control the loop tension. Maintaining tension on the chain of interconnected phase insulators prevents any slippage of the insulators back toward the apparatus of FIG. 1 and prevents any buckling of the planar portions 25 which could interfere with movement of the phase insulators by the feed unit 47 (FIG. 1). The counterweight arm is supported by pivot rod 645 which is rotatably supported within block 647 attached to the support stand by way of plate 649. Eccentric cams 651 and 653 are secured to the pivot rod, for actuating the limit switches 655 and 657, respectively. The cams rotate with the pivot rod which is rotated as the counterweight arm moves.

In operation of the take-up unit 173, the interconnected phase insulators 23 are allowed to accumulate in a loop as illustrated in FIG. 2 until the counterweight arm is moved downwardly to a predetermined low limit position; whereupon, the limit switch 655 is actuated by the cam 651 which in turn operates the clutch for causing driving engagement between the motor 635 and take-up reel 31. The reel is turned by the motor to take-up the phase insulators until the lever arm 641 moves upwardly a sufficient distance to cause actuation of the limit switch 657 by the eccentric cam 653. Actuation of the limit switch 657 causes the clutch to disengage the motor and take-up reel, and thus, stops rotation of the take-up reel until the phase insulator loop has increased a sufficient amount so as to again cause actuation of the limit switch 655.

It may be desirable to accumulate the phase insulators on a take-up reel as illustrated in FIG. 2. The interconnecting segments 29 between the phase insulators will be subsequently severed prior to placement into dynamoelectric machine cores. On the other hand, it may be desirable to separate the phase insulators as they are being fabricated by the apparatus 21 of FIG. 1. This separation of the phase insulators at the apparatus can be accomplished by a severing or cutting means illustrated as the severing devices 175 and 177 in FIG. 14. The severing devices 175 and 177 may be mounted on the support plates 179 and 181, respectively, (FIG. 1), and would have the planar strips 33 and 35, respectively, fed therethrough for severing the planar interconnecting segments and establishing discrete or separated phase insulators. As illustrated in FIG. 14, the severing devices 175 and 177 are positioned on the support plates 179 and 181, respectively, and retained thereon by bolts 659. The air cylinders 661 and 663 of cutting devices 175 and 177, respectively, are substantially simultaneously extended, for initiating the severing operation.

Because the two severing devices are identical or mirror images of each other, the details of the severing devices will be described in terms of the severing device 177 which is illustrated in cross-section in FIG. 15.

As shown in FIG. 15, the air cylinder 663 is supported and attached to a top support 665 by bolts 667. The cylinder has its actuating rod 669 connected to the punch holder 671 by way of cylinder adapter 673. The punch holder has bearings 675 and 677 mounted therein to facilitate movement of the holder along guide rods 679 and 681, respectively, which are bolted between the top support 665 and die holder 683. Punch 685 having a shearing edge or surface 687 is secured to the punch holder by bolt 689 and dowel pins 691. The punch also has a field bar 692 bolted thereto. The die holder 683 has die 693 (FIG. 14) secured thereto and retains a movable stripper 695 therein. The stripper is retained within the die holder by shoulder screws 697 which threadingly engage the stripper but which are movable within the die holder upon compression of compression spring 699.

Referring to FIG. 14, the phase insulators 23 (FIG. 3) are positioned relative to the cutting unit 177 such that an interconnecting planar segment 29 (FIG. 3) is positioned over shearing edge 701 of the die 693. An interconnecting planar segment is cut by actuating the air cylinder 663 causing the punch 685 to move downwardly. The punch traps planar material against the stripper 695, compresses the stripper, and shears a planar interconnecting segment against the shearing edge of the die. The field bar 692 (FIG. 15) also moves downward with the punch and moves within the previously notched out portion between the adjacent planar portions 25 (FIG. 3) being separated and facilitates positioning of the planar strip for the shearing operation. It has been found that the field bar may be eliminated and instead, the punch and die may be provided with shearing surfaces which extend across the entire widths thereof. Although the cutting operation has been described in terms of the cutting unit 177, it is to be understood that an oppositely disposed planar interconnecting segment is being simultaneously cut or sheared by the cutting unit 175.

When the cutting units 175 and 177 are utilized with the apparatus 21 of FIG. 1, the punches, such as, for example, the punch 685, of each of the cutting units are extended and retracted substantially simultaneously with the punches 71 and 73 (FIG. 3) located at the configuring station. As mentioned previously, the punches of the cutting units trap their respective planar strip, when in their down position, against their respective stripper. Thus, the punches are utilized to maintain tension on the planar strips to prevent any retraction thereof which could possibly cause buckling of the planar strips as the feed unit 47 (FIG. 1) is extended toward the securing station in preparation for another pulling or feeding operation upon the planar strips.

As discussed herein, the apparatus 21 of FIG. 1 is provided with a means of varying the separation or spaced apart distance between the two planar strips 33 and 35. It is desirable to vary such distance in order to fabricate phase insulators for dynamoelectric machines having magnetic cores of different stack heights or axial lengths. As discussed herein, the elements or assemblies such as, for example, the planar supply reel 43, the configuring device 99, the welding assembly 403 and the clamping unit 53, which are associated with the planar strip 33 are mounted so as to be movable with the movable plate 185. An adjustment means shown as including handwheel adjustment screw 703 is provided for moving the movable plate and thereby varying the separation distance between the two planar strips. The handwheel adjustment screw extends through angle support 705 attached to the apparatus base or table 303. The screw extends through a bearing 707 within the angle support and through a not shown retainer disposed against the angle support opposite the bearing so as to allow only radial or turning movement of the screw. The screw also threadingly engages flanged nut 709 which is bolted to the strip guide support 205 attached to the movable plate. Turning of the handwheel adjustment screw causes transverse movement of the movable plate along guides 711, 483 and 713 attached to the fixed plate 183. Spacers 715 which may typically have thicknesses of, for example, $\frac{1}{8}$ inch, are pivotally disposed about the adjustment screw and provide a means for setting the spaced apart distance between the two strips. In FIG. 1, the travel distance of the movable plate is set by the spacers within the group generally designed by reference numeral 717 which have portions thereof positioned between the side of the movable plate and stop block 719 which is attached to the fixed plate. The spaced apart distance between the planar strips may be varied by adjusting the adjustment screw and positioning a greater or lesser number of the spacers between the side surface of the movable plate and the stop. As mentioned previously, this spaced apart distance between the two planar strips is adjusted to provide for fabrication of phase insulators for cores having different stack heights. Adjustment of the apparatus for these different insulators also involves adjustment of the travel distance of the advancing cylinder 147 by the positioning of the spacers 393 (FIG. 6) as previously discussed so as to vary the length of the connectors being secured between the two planar strips. The severing blades 155 and 157 (FIG. 9) are also changed to provide for severing and positioning of the different length connectors at the securing station.

Figure 16:
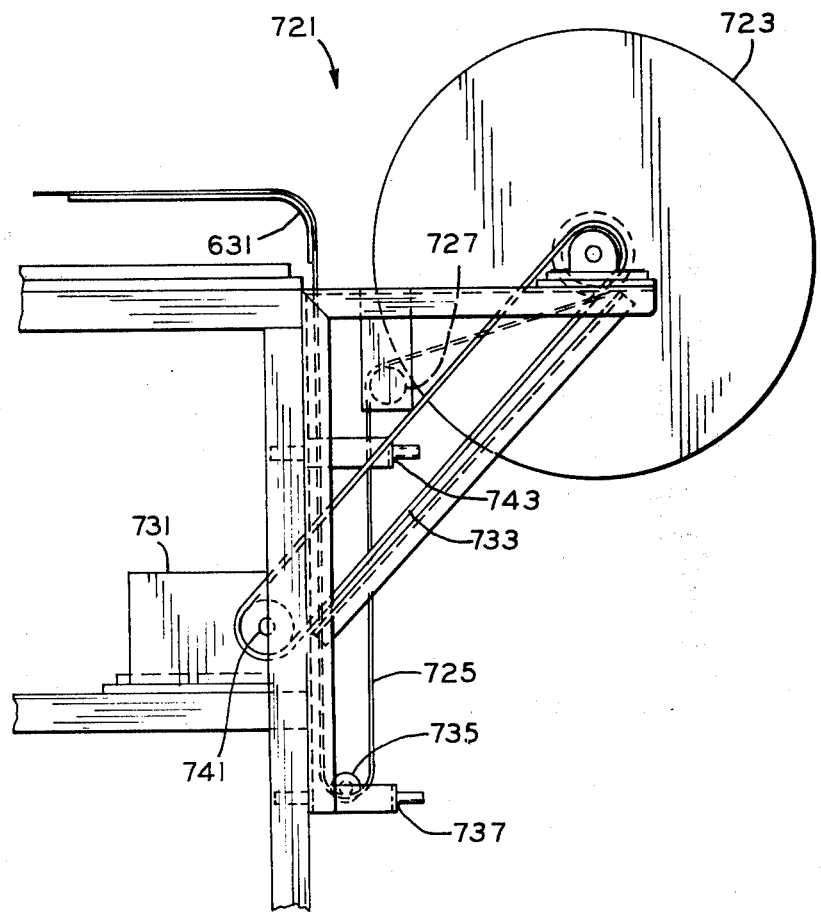
FIG. 16 is a side elevational view of a different take-up unit different from the one shown in FIG. 2.

FIG. 16 illustrates a different take-up unit 721 which is accumulating or rolling up interconnected phase insulators on a spool or reel 723 as the phase insulators are moved from the apparatus 21 (FIG. 1). As illustrated, the phase insulators establish a loop 725 between the take-up reel and the plate 631 of the apparatus and are fed over guide roll 727 onto the take-up reel. The take-up reel is driven by a variable speed DC motor 729 (FIG. 17) which is interconnected with the reel by way of gear and clutch arrangement 731 and chain 733. A weight 735 such as, for example, two pounds, lays on the loop to provide tension in the loop of interconnected insulators. The illustrated take-up provides continuous rotation of the take-up reel and thus, provides a relatively smooth take-up or accumulation of the insulators on the reel so as minimize possible problems of phase insulator distortion resulting from stopping and starting of a take-up reel. For each speed of the motor, the gear and clutch arrangement provides an output for driving the reel at either a high speed or a low speed.

In operation of the take-up unit 721, the reel 723 is driven at a low speed until the phase insulator loop 725 accumulates to the illustrated position to cause blocking and actuation of low limit photocell unit 737. The low limit photocell unit causes actuation of high speed clutch 739 (FIG. 17) within the gear and clutch arrangement 731 to cause high speed rotation of output shaft 741 for driving the reel at high speed. The reel is driven at the high speed until the insulator loop is decreased a sufficient amount to cause actuation of high limit photocell unit 743, that is, the photocell unit senses that the loop is above the unit. Actuation of the high limit photocell unit in turn causes actuation of a low speed clutch 745 and deactuation of the high speed clutch within the gear and clutch arrangement to cause low speed rotation of the output shaft thereby causing low speed rotation of the take-up reel until the low limit photocell unit 737 is once again actuated.

Further details of the take-up unit 721 are illustrated in FIG. 17. The motor 729 is connected to drive shaft 747 by way of reducer 749 and coupling 751. A low speed rotation of the output shaft 741 is provided by interconnected gears 753 and 755, sprockets 757 and 759 and the low speed clutch 745. An initial reduction in speed is provided by driving engagement between the differently sized gears 753 and 755 and a still further reduction to the desired low speed value is provided by the differently sized sprockets 757 and 759 which are interconnected by timing belt 761. Actuation of the low speed clutch having the sprocket 759 connected thereto, causes engagement with the output shaft 741 for providing a low speed output. A high speed rotation of the output shaft is provided by interconnected gears 763 and 765, sprockets 767 and 769, and the high speed clutch 741. In the illustrated arrangement, the engaging gears 763 and 765 are of the same size, and the sprockets 767 and 769 which are interconnected by timing belt 771, are of the same size so as to provide an output speed for the output shaft 741 which is the same as the speed of the input shaft 747. Actuation of the high speed clutch 739 having the sprocket 769 connected thereto, causes engagement with the output shaft 741 for providing a high speed output. The output shaft 741 of the gear and clutch unit is interconnected with reel shaft 773 for driving the take-up reel 723 by way of sprockets 775 and 777, and the chain 733 with bearing units 779 and 781 being provided for rotational mounting of the reel shaft.

In a take-up unit fabricated in accordance with FIGS. 16 and 17, the motor 729 was a General Electric one-twelvth horsepower shunt-wound 90 volt DC motor Model No. 5BN694All (1725 r.p.m.) with the speed thereof controlled by a Boston Ratiotrol speed control No. RP1-100; the reducer 749 was a Boston reducer No. TWF-109-200; the gears 753, 755, 763 and 765 were Boston Gear No. GA-20, GA-80, GA-50 and GA-50, respectively; the timing sprockets 757, 759, 767 and 769 were Morse Timing Belt Sprockets No. 12LO50, 24LO50, 28050, and 28050, respectively; the sprockets 775 and 777 were Boston Sprockets No. HKSA-18-1 with one-half inch and three-fourths inch bores, respectively; and the clutches 739 and 745 were Sterns clutch model MSR with 90 volts DC operation and with spring size 3, and were operated by way of a Sterns Rectifier Series 7000 No. 4-1-07122-02.

With final reference to FIG. 6, it should be noted that normal operation of the apparatus there shown will often result in elongated and straightened material segments being located between clamping devices 123 and 129 at the beginning of a "stretching" sub-cycle. In other words, once indeterminate segments 67, 69 have been elongated, predetermined segment lengths have been fed beyond clamping device 163, and the clamping devices 129, 123, have returned to their "home" positions; part of the segments 67, 69 extending between the devices 129, 123 will be in a straightened and elongated configuration or condition. However, other parts of those same segments (that previously extended from the face plate of frame 301 to device 123) will not yet have been elongated. Thus, during most "stretching" sub-cycles, only those parts of segments 67, 69 that have not previously been elongated will be elongated. In addition, while device 129 is returning to its "home" position, only part of the then elongated segments 67, 69 will relatively advance beyond device 129 toward device 163.

It also should now be noted that the straightened segments that are fed into the connecting station (e.g., see 153 in FIG. 11) are fed while being substantially unconfined. Moreover, these straightened segments lie straight and parallel to one another because of their straightened condition.

While the present invention has been described in terms of particular embodiments of apparatus and methods, it should now be apparent that numerous modifications will suggest themselves to those of ordinary skill in the art. Accordingly, it is intended by the following claims to cover all such modifications and variations which fall within the scope thereof.

What we claim as new and desire to secure by Letters Patent of the United States is:

1. An apparatus for fabricating electrical phase insulators for providing electrical separation between winding phases of a dynamoelectric machine wherein a phase insulator includes two spaced apart planar portions formed of an insulating material interconnected by at least one connector made of an insulating material, the apparatus comprising: a conditioning station; a securing station; means for supplying first and second strips of planar insulating material of indeterminate length to the securing station; connector supply means for supplying at least one strip of connector insulating material of indeterminate length to the conditioning station; the conditioning station including stretching means for elongating a portion of the at least one strip of connector insulating material of indeterminate length and for straightening the at least one strip by removing curvature from the at least one strip, said stretching means including means for varying the amount of elongation of the portion of the at least one strip of connector insulating material; means for advancing a portion of the at least one strip of connector insulating material to the securing station after the portion has been elongated and straightened at the stretching station; means for severing the portion of the at least one strip for establishing an elongated segment for use as a phase insulator connector; and securing means located at the securing station for securing one end of the elongated segment to the first strip of planar insulating material and for securing the other end of the elongated segment to the second strip of insulating material thereby interconnecting the two planar strips.

2. An apparatus for fabricating electrical phase insulators for providing electrical separation between winding phases of a dynamoelectric machine wherein a phase insulator includes two spaced apart planar portions formed of an insulating material interconnected by at least one connector made of an insulating material, the apparatus comprising: a conditioning station; a securing station; means for supplying first and second strips of planar insulating material of indeterminate length to the securing station; connector supply means for supplying at least one strip of connector insulating material of indeterminate length to the conditioning station; the conditioning station including stretching means for elongating a portion of the at least one strip of connector insulating material of indeterminate length and for straightening the at least one strip by removing curvature from the at least one strip, said stretching means including two spaced apart clamping devices for gripping the at least one strip of connector insulating material at spaced apart locations and means for moving at least one of the clamping devices while the strip is simultaneously gripped by both clamping devices thereby causing elongation of at least a portion of the connector strip material located between the two clamping devices; means for advancing a portion of the at least one strip of connector insulating material to the securing station after the portion has been elongated and straightened at the stretching station; means for severing the portion of the at least one strip for establishing an elongated segment for use as a phase insulator connector; and securing means located at the securing station for securing one end of the elongated segment to the first strip of planar insulating material and for securing the other end of the elongated segment to the second strip of insulating material thereby interconnecting the two planar strips.

3. The apparatus of claim 2 wherein the means for advancing connector insulating material to the securing station includes at least one of the clamping devices of the stretching means and wherein movement of the at least one clamping device for elongating the portion of connector material causes previously elongated connector material to be advanced to the securing station.

4. The apparatus of claim 3 wherein movement of the other clamping device is retarded by a restraining force determined in accordance with the amount of elongation desired and wherein the means for moving the at least one clamping device also causes movement of the other clamping device by overcoming the restraining force.

5. The apparatus of claim 1 further comprising a means for positioning the elongated segment of connector material relative to the first and second planar strips for securement thereto.

6. The apparatus of claim 5 wherein the means for positioning the elongated segment includes at least one movable element for retaining the elongated segment on the means for severing.

7. The apparatus of claim 1 wherein the securing means includes at least one ultrasonic welding device for fusing the ends of the elongated segments to their respective strip of planar insulating material.

8. The apparatus of claim 1 further including a strip adjustment means for varying separation distance between the two spaced apart planar strips at the securing station in accordance with a predetermined stack height of dynamoelectric machine magnetic cores into which the phase insulators are to be placed.

9. The apparatus of claim 1 further including advance adjustment means for varying the length of connector insulating material moved to the securing station by the means for advancing connector insulating material thereby allowing phase insulators to be fabricated for dynamoelectric machines having magnetic cores of different stack heights.

10. The apparatus of claim 1 further including punching means for cutting portions of at least one of the planar strips so as to simultaneously establish a desired configuration for a trailing end of the one phase insulator and a desired configuration for a leading end of another phase insulator.

11. The apparatus of claim 1 further including take-up means for receiving unsevered phase insulators after they are moved from the securing station.

12. The apparatus of claim 1 further including a cutting mechanism for severing the two planar strips after they are moved from the securing station for establishing discrete phase insulators.

13. An apparatus for fabricating a plurality of electrical phase insulators for use in dynamoelectric machines wherein each phase insulator includes two spaced apart longitudinally extending planar portions formed of an insulating material interconnected by at least one connector strip made of an insulating material, the apparatus comprising: means for supplying first and second planar strips of insulating material along spaced apart paths to a securing station; connector supply means for supplying connector strip insulating material of indeterminate length in a direction generally transverse to the longitudinal extent of the two planar strips; means for gripping a first section of the connector strip insulating material; means for gripping a second section of the connector strip insulating material at a location spaced apart from the first section; means for moving the first section and the second section relative to each other and thereby stretching a portion of the connector strip insulating material located between the first and the second sections relative to each other, and wherein the means for moving is operative to advance previously stretched portions of the connector strip insulating material toward the securing station; means for severing a previously stretched portion of the connector strip insulating material for establishing a stretched connector; securing means located at the securing station for securing one end of the stretched connector to the first planar strip and for securing the other end of the stretched connector to the second planar strip thereby interconnecting the two planar strips.

14. The apparatus of claim 13 wherein the means for moving the first and the second sections of the at least one connector strip relative to each other includes a means for advancing the first section and a means for restraining the second section.

15. The apparatus of claim 14 wherein the means for advancing the first section of the at least one strip of connector material causes movement of the second section by overcoming a restraining force being applied by the means for restraining.

16. The apparatus of claim 15 wherein the restraining force of the means for restraining is variable in accordance with the desired elongation of the portion of the connector strip located between the first and the second sections.

* * * * *